US012753762B2

(12) United States Patent
Kurihara et al.

(10) Patent No.: US 12,753,762 B2
(45) Date of Patent: Oct. 6, 2026

(54) PRESSURE CONTROL VALVE

(71) Applicant: EAGLE INDUSTRY CO., LTD., Tokyo (JP)

(72) Inventors: Daichi Kurihara, Tokyo (JP); Kohei Fukudome, Tokyo (JP); Akihiro Hashiguchi, Tokyo (JP)

(73) Assignee: EAGLE INDUSTRY CO., LTD., Tokyo (JP)

(*) Notice: Subject to any disclaimer, the term of this patent is extended or adjusted under 35 U.S.C. 154(b) by 0 days.

(21) Appl. No.: 18/866,469

(22) PCT Filed: May 15, 2023

(86) PCT No.: PCT/JP2023/018042
§ 371 (c)(1),
(2) Date: Nov. 15, 2024

(87) PCT Pub. No.: WO2023/223992
PCT Pub. Date: Nov. 23, 2023

(65) Prior Publication Data

US 2025/0327450 A1 Oct. 23, 2025

(30) Foreign Application Priority Data

May 18, 2022 (JP) ................................ 2022-081764

(51) Int. Cl.
*F04C 28/24* (2006.01)
*F04C 27/00* (2006.01)
*F16K 31/06* (2006.01)

(52) U.S. Cl.
CPC ........... *F04C 28/24* (2013.01); *F04C 27/005* (2013.01); *F16K 31/06* (2013.01)

(58) Field of Classification Search
CPC ........ F04C 28/24; F04C 27/005; F04C 18/02; F16K 31/06; F16K 1/34
USPC .................................................... 251/129.15
See application file for complete search history.

(56) References Cited

U.S. PATENT DOCUMENTS

| | | | | |
|---|---|---|---|---|
| 1,876,515 | A | 9/1932 | Emmet et al. | |
| 2,244,450 | A | 6/1941 | Erni | |
| 3,380,040 | A | 4/1968 | Liggett | F16C 17/045 |
| 3,383,116 | A | 5/1968 | Carter | 277/96 |
| 3,443,813 | A | 5/1969 | Carlsson | F16J 15/3416 |
| 3,527,465 | A | 9/1970 | Guinard | |
| 3,675,935 | A | 7/1972 | Ludwig | F16J 15/342 |
| 3,695,789 | A | 10/1972 | Jansson | F01C 21/003 |

(Continued)

FOREIGN PATENT DOCUMENTS

JP 2018021520 A * 2/2018 ............. F04C 29/04

OTHER PUBLICATIONS

JP-2018021520-A, Machine Translation (Year: 2018).*

*Primary Examiner* — Daphne M Barry
(74) *Attorney, Agent, or Firm* — HAYES SOLOWAY P.C.

(57) ABSTRACT

A valve capable of smoothly changing pressure is provided. The valve includes a housing that partitions a first space into which a suction fluid flows, a second space into which a discharge fluid flows, and a third space into which a control fluid flows, and a valve element to be separated from and seated on the housing so that fluid flows in and out the third space, and a pressure receiving surface of the discharge fluid acting on the valve element is narrower than a pressure receiving surface of the suction fluid acting on the valve element.

10 Claims, 9 Drawing Sheets

(56) References Cited

U.S. PATENT DOCUMENTS

| | | | | |
|---|---|---|---|---|
| 3,704,019 | A | 11/1972 | McHugh | 277/400 |
| 3,782,737 | A | 1/1974 | Ludwig et al. | 277/27 |
| 4,056,478 | A | 11/1977 | Capelli | C01M 5/00 |
| 4,071,253 | A | 1/1978 | Heinen et al. | 277/3 |
| 4,523,764 | A | 6/1985 | Albers et al. | 277/3 |
| 4,772,188 | A | 9/1988 | Kimura et al. | F04C 18/04 |
| 4,874,302 | A | 10/1989 | Kobayashi et al. | F04C 18/04 |
| 4,889,348 | A | 12/1989 | Amundson | 277/306 |
| 5,071,141 | A | 12/1991 | Lai et al. | |
| 5,092,612 | A | 3/1992 | Victor et al. | 277/96.1 |
| 5,174,584 | A | 12/1992 | Lahrman | 277/400 |
| 5,180,173 | A | 1/1993 | Kimura et al. | |
| 5,224,714 | A | 7/1993 | Kimura | 277/400 |
| 5,316,455 | A | 5/1994 | Yoshimura | F04C 29/0021 |
| 5,447,316 | A | 9/1995 | Matsui | 277/400 |
| 5,556,111 | A | 9/1996 | Sedy | 277/400 |
| 5,558,341 | A | 9/1996 | McNickle | 277/400 |
| 5,769,604 | A | 6/1998 | Gardner et al. | 415/170.1 |
| 5,834,094 | A | 11/1998 | Etsion et al. | 428/156 |
| 5,947,481 | A | 9/1999 | Young | 277/400 |
| 5,952,080 | A | 9/1999 | Etsion et al. | 428/156 |
| 6,002,100 | A | 12/1999 | Etsion | 219/121.71 |
| 6,046,430 | A | 4/2000 | Etsion | 219/121.71 |
| 6,135,458 | A | 10/2000 | Fuse | 277/401 |
| 6,152,452 | A | 11/2000 | Wang | 277/400 |
| 6,213,473 | B1 | 4/2001 | Lebeck | |
| 6,446,976 | B1 | 9/2002 | Key et al. | F16J 15/34 |
| 6,692,006 | B2 | 2/2004 | Holder | 277/346 |
| 6,726,213 | B2 | 4/2004 | Wang | 277/400 |
| 7,258,346 | B2 | 8/2007 | Tejima | 277/399 |
| 7,377,518 | B2 | 5/2008 | Lai | 277/400 |
| 7,758,051 | B2 | 7/2010 | Roberts-Haritonov | 277/401 |
| 7,931,277 | B2 | 4/2011 | Garrison | 277/399 |
| 8,100,405 | B2 | 1/2012 | Kneeland et al. | 277/355 |
| 8,128,061 | B2 * | 3/2012 | Uemura | F04B 27/1804 251/129.15 |
| 8,342,534 | B2 | 1/2013 | Vasagar | 277/399 |
| 8,585,060 | B2 | 11/2013 | Oshii et al. | 277/401 |
| 9,022,061 | B2 * | 5/2015 | Kim | F04B 27/1804 251/129.15 |
| 9,151,390 | B2 | 10/2015 | Hosoe | F16J 15/3412 |
| 9,169,931 | B2 | 10/2015 | Tokunaga | F16J 15/34 |
| 9,228,660 | B2 | 1/2016 | Hosoe | F16J 15/3412 |
| 9,353,867 | B2 | 5/2016 | Itadani et al. | F16J 15/3448 |
| 9,494,239 | B2 | 11/2016 | Hosoe | F16J 15/342 |
| 9,512,923 | B2 | 12/2016 | Inoue et al. | F16J 15/34 |
| 9,574,666 | B2 | 2/2017 | Ferris | F16J 15/3412 |
| 9,574,667 | B2 | 2/2017 | Takahashi et al. | F16J 15/342 |
| 9,587,745 | B2 | 3/2017 | Itadani | F16J 15/348 |
| 9,772,037 | B2 | 9/2017 | Itadani et al. | F16J 15/3412 |
| 9,784,372 | B2 | 10/2017 | Iguchi | F16J 15/342 |
| 9,863,473 | B2 | 1/2018 | Hosoe et al. | F16C 33/741 |
| 9,958,010 | B2 | 5/2018 | Itadani | F16C 33/74 |
| 9,982,715 | B2 | 5/2018 | Gorges et al. | F16C 33/201 |
| 10,054,230 | B2 | 8/2018 | Katori et al. | F16J 15/3412 |
| 10,132,411 | B2 | 11/2018 | Hosoe et al. | F16J 15/164 |
| 10,337,620 | B2 | 7/2019 | Tokunaga et al. | F16J 15/342 |
| 10,443,737 | B2 | 10/2019 | Itadani et al. | F16J 15/342 |
| 10,495,228 | B2 | 12/2019 | Itadani | F16J 15/342 |
| 10,865,883 | B2 | 12/2020 | Seki et al. | F16J 15/3404 |
| 11,053,975 | B2 | 7/2021 | Imura | F16C 17/045 |
| 11,221,071 | B2 | 1/2022 | Sasaki et al. | F16J 15/34 |
| 11,248,706 | B2 | 2/2022 | Imura | F16C 33/74 |
| 11,320,052 | B2 | 5/2022 | Imura et al. | F16J 15/34 |
| 11,815,184 | B2 | 11/2023 | Inoue et al. | F16J 15/34 |
| 11,821,521 | B2 | 11/2023 | Imura et al. | F16J 15/34 |
| 11,913,454 | B2 | 2/2024 | Suzuki | F04C 29/00 |
| 12,152,676 | B2 | 11/2024 | Suzuki | |
| 2002/0014743 | A1 | 2/2002 | Zheng | 277/358 |
| 2002/0093141 | A1 | 7/2002 | Wang | F16J 15/34 |

| | | | | |
|---|---|---|---|---|
| 2002/0158416 | A1 | 10/2002 | Hosanna | F16J 15/3404 |
| 2003/0041680 | A1 | 3/2003 | Saito et al. | F02N 15/06 |
| 2004/0080112 | A1 | 4/2004 | Tejima | F16J 15/3436 |
| 2005/0135957 | A1 | 6/2005 | Park | F04C 18/0215 |
| 2005/0212217 | A1 | 9/2005 | Tejima | 277/399 |
| 2005/0263963 | A1 | 12/2005 | Lai | 277/399 |
| 2007/0228664 | A1 | 10/2007 | Anand | F16J 15/3496 |
| 2007/0267820 | A1 | 11/2007 | Martin | F16J 15/3496 |
| 2007/0275267 | A1 | 11/2007 | Sabouni | F16J 15/3496 |
| 2007/0296156 | A1 | 12/2007 | Yanagisawa et al. | 277/352 |
| 2008/0050260 | A1 | 2/2008 | Iwanami et al. | 418/55.6 |
| 2008/0100001 | A1 | 5/2008 | Flaherty | |
| 2009/0200749 | A1 | 8/2009 | Teshima | F16J 15/3484 |
| 2011/0194966 | A1 | 8/2011 | Takeuchi | F04B 18/0215 |
| 2011/0215531 | A1 | 9/2011 | Tokunaga et al. | 277/399 |
| 2011/0215535 | A1 | 9/2011 | Vasagar | 277/559 |
| 2011/0305871 | A1 | 12/2011 | Tabuchi | F16J 15/3284 |
| 2012/0018957 | A1 | 1/2012 | Watanabe | F16J 15/34 |
| 2012/0217705 | A1 | 8/2012 | Hosoe | 277/400 |
| 2013/0168928 | A1 | 7/2013 | Schrufer | C10M 103/12 |
| 2013/0209011 | A1 | 8/2013 | Tokunaga | |
| 2013/0323105 | A1 | 12/2013 | Chao et al. | F04C 29/028 |
| 2014/0159314 | A1 | 6/2014 | Hosoe | F16J 15/34 |
| 2014/0197600 | A1 | 7/2014 | Hosoe | F16J 15/342 |
| 2014/0217676 | A1 | 8/2014 | Hosoe et al. | 277/350 |
| 2014/0294330 | A1 | 10/2014 | Tokunaga | F16C 17/04 |
| 2014/0319776 | A1 | 10/2014 | Theike et al. | |
| 2015/0036955 | A1 | 2/2015 | Nomura et al. | F16C 33/20 |
| 2015/0115540 | A1 | 4/2015 | Tokunaga | F16J 15/34 |
| 2015/0123350 | A1 | 5/2015 | Itadani | F16J 15/3412 |
| 2015/0167847 | A1 | 6/2015 | Tokunaga | |
| 2015/0184752 | A1 | 7/2015 | Itadani | F16J 15/3412 |
| 2015/0345642 | A1 | 12/2015 | Haas | F16J 15/3496 |
| 2015/0377297 | A1 | 12/2015 | Tokunaga et al. | F16C 33/748 |
| 2015/0377360 | A1 | 12/2015 | Itadani | F16J 15/3448 |
| 2016/0033045 | A1 | 2/2016 | Itadani et al. | F16J 15/3412 |
| 2016/0097457 | A1 | 4/2016 | Sun et al. | F16J 15/3412 |
| 2017/0089467 | A1 | 3/2017 | Young | F01D 11/003 |
| 2017/0146014 | A1 | 5/2017 | Ohta et al. | F04C 29/0021 |
| 2017/0241549 | A1 | 8/2017 | Itadani | F16J 15/3412 |
| 2017/0261107 | A1 | 9/2017 | Martin | F16J 15/3452 |
| 2017/0350407 | A1 | 12/2017 | Yamamoto et al. | F04D 29/046 |
| 2018/0017163 | A1 | 1/2018 | Hosoe et al. | F16J 15/164 |
| 2018/0073394 | A1 | 3/2018 | Tokunaga et al. | F01D 25/18 |
| 2018/0112711 | A1 | 4/2018 | Itadani | F16J 15/363 |
| 2018/0128377 | A1 | 5/2018 | Tukunaga et al. | F16J 15/342 |
| 2018/0128378 | A1 | 5/2018 | Tokunaga et al. | F16J 15/342 |
| 2018/0135699 | A1 | 5/2018 | Tokunaga et al. | F16C 33/80 |
| 2018/0172162 | A1 | 6/2018 | Tokunaga et al. | F16J 15/34 |
| 2018/0195618 | A1 | 7/2018 | Itadani et al. | F16J 15/3416 |
| 2018/0299015 | A1 | 10/2018 | Itadani | F16J 15/3448 |
| 2019/0169988 | A1 | 6/2019 | Tokunaga et al. | F01C 19/12 |
| 2019/0170257 | A1 | 6/2019 | Hosoe et al. | F16J 15/3412 |
| 2019/0211828 | A1 | 7/2019 | Teshima et al. | |
| 2019/0285115 | A1 | 9/2019 | Negishi et al. | F16C 17/045 |
| 2019/0301522 | A1 | 10/2019 | Negishi et al. | F16C 17/02 |
| 2019/0331162 | A1 | 10/2019 | Negishi | F16J 15/34 |
| 2020/0141444 | A1 | 5/2020 | Thatte | F16C 17/08 |
| 2020/0224722 | A1 | 7/2020 | Imura | F16C 33/743 |
| 2020/0224768 | A1 | 7/2020 | Imura | F16J 15/3412 |
| 2020/0240470 | A1 | 7/2020 | Sorgenti | F16J 15/3212 |
| 2020/0332901 | A1 | 10/2020 | Imura | F16J 15/3412 |
| 2021/0041026 | A1 | 2/2021 | Imura | F16J 15/3424 |
| 2021/0048062 | A1 | 2/2021 | Masumi et al. | F16C 17/102 |
| 2021/0048106 | A1 | 2/2021 | Imura et al. | F16J 15/3412 |
| 2021/0080009 | A1 | 3/2021 | Kimura et al. | F16J 15/3412 |
| 2021/0116030 | A1 | 4/2021 | Kimura et al. | F16J 15/182 |
| 2021/0116032 | A1 | 4/2021 | Kimura | F16J 15/188 |
| 2021/0355992 | A1 | 11/2021 | Tokunaga | F16J 15/3412 |
| 2021/0364034 | A1 | 11/2021 | Okada | F16J 15/342 |
| 2022/0056949 | A1 | 2/2022 | Ikeda et al. | F16C 17/04 |
| 2022/0128151 | A1 | 4/2022 | Tuk et al. | F16J 15/34 |

* cited by examiner

PRESSURE CONTROL VALVE

TECHNICAL FIELD

The present invention relates to a valve, for example, a valve that controls pressure.

BACKGROUND ART

As one of compressors utilized in various industrial fields, there is a scroll compressor. This type of compressor not only has high compression efficiency but also produces low noises. Thus, the scroll compressor is utilized in various ways, for example, in a refrigeration cycle, etc.

The scroll compressor includes a scroll compression mechanism including a stationary scroll which is provided with a spiral wrap, and a movable scroll which is provided with a spiral wrap, and an eccentric mechanism attached to a rotating shaft, the eccentric mechanism that eccentrically rotates the movable scroll, etc., and has a structure that by making the movable scroll relatively slide with respect to the stationary scroll with eccentric rotation, a fluid serving as a refrigerant supplied from a low-pressure chamber on the outer diameter side of both the scrolls is pressurized, and a high-pressure refrigerant is discharged from a discharge hole formed in center of the stationary scroll.

In this type of scroll compressor, when pressure of a discharge chamber to which the refrigerant compressed by the scroll compression mechanism is discharged is increased, a force acts in the direction in which the movable scroll is separated from the stationary scroll.

In a scroll compressor of Patent Citation 1, a communication passage providing communication between a discharge chamber and a back pressure chamber formed on the back surface side of the movable scroll is provided, and an orifice is provided in the communication passage. Part of a compressed refrigerant in the discharge chamber is depressurized and adjusted by the orifice and supplied to the back pressure chamber, so that the movable scroll is pressed toward the stationary scroll. Thus, the movable scroll is prevented from being separated from the stationary scroll.

In addition, the scroll compressor has a pressure adjustment valve that releases and adjusts pressure of the back pressure chamber to a low-pressure chamber. With the pressure adjustment valve, when a force of pushing a valve element in the valve opening direction by the pressure of the back pressure chamber exceeds a force of pushing the valve element in the valve closing direction by pressure of the low-pressure chamber and a bias force of a spring, the pressure adjustment valve is brought into an open state, the refrigerant of the back pressure chamber flows to the low-pressure chamber, and the pressure of the back pressure chamber is lowered. Thereby, it is prevented that the movable scroll is excessively pressed onto the stationary scroll by an increase in the pressure of the back pressure chamber and a smooth action of the movable scroll is inhibited.

CITATION LIST

Patent Literature

Patent Citation 1: WO 2022/009769 A1 (Page 1, FIG. 1)

SUMMARY OF INVENTION

Technical Problem

However, the scroll compressor of Patent Citation 1 has the structure that part of the refrigerant of the discharge chamber is supplied to the back pressure chamber via the orifice by a constant amount, and has a problem that a change in the pressure of the back pressure chamber is small with respect to a change in pressure of the discharge chamber, and it takes time before the pressure of the back pressure chamber becomes proper pressure.

The present invention has been made in view of such a problem and an object of the present invention is to provide a valve capable of smoothly changing pressure.

Solution to Problem

In order to solve the foregoing problem, a valve according to the present invention is a valve including a housing that partitions a first space into which a suction fluid flows, a second space into which a discharge fluid flows, and a third space into which a control fluid flows; and a valve element to be separated from and seated on the housing so that fluid flows in and out the third space, wherein a pressure receiving surface of the discharge fluid acting on the valve element is narrower than a pressure receiving surface of the suction fluid acting on the valve element. According to the aforesaid feature of the present invention, by a balance between pressure acting on the valve element in the direction in which the valve element is separated from a valve seat and pressure acting on the valve element in the direction in which the valve element is seated on the valve seat, a valve opening degree is adjusted. Thus, it is possible to smoothly change the valve opening degree. Thereby, it is possible to provide the valve capable of smoothly changing the pressure. In addition, since it is possible to reduce operations of pressure of the discharge fluid having relatively high pressure with respect to the suction fluid, it is possible to suppress radical movement of the valve element.

It may be preferable that the pressure receiving surface of the discharge fluid is narrower than a pressure receiving surface of the control fluid acting on the valve element. According to this preferable configuration, since it is possible to reduce the operations of the pressure of the discharge fluid having relatively high pressure with respect to the control fluid, it is possible to suppress radical movement of the valve element.

It may be preferable that pressure of the suction fluid and pressure of the discharge fluid act on the valve element in a same direction upon separation and seating of the valve element. According to this preferable configuration, by a balance between the pressure of the suction fluid and the pressure of the discharge fluid acting on the valve element, and pressure of the control fluid acting on the valve element, the valve opening degree is adjusted. Thus, it is possible to more smoothly change the valve opening degree.

It may be preferable that the valve may include a bias member that biases the valve element in separation and seating direction. According to this preferable configuration, the valve opening degree is easily adjusted by the bias member.

It may be preferable that at least one of the first space, the second space and the third space is divided into a first space and a second space each of which is arranged in each of both axial ends of the housing. According to this preferable configuration, the valve element can receive the pressure of the same fluid on both the axial end sides of the housing. Therefore, the valve element is easily moved.

It may be preferable that the valve further includes a drive source that drives the valve element. According to this preferable configuration, since it is possible to operate the valve element by the drive source, it is possible to enhance control responsiveness.

It may be preferable that the drive source has a rod connectable to and separable from the valve element. According to this preferable configuration, it is possible to make that the rod does not act on the valve element after the valve element is driven by the rod.

DESCRIPTION OF EMBODIMENTS

Modes for carrying out a valve according to the present invention will be described below on the basis of embodiments.

First Embodiment

Figure 1:
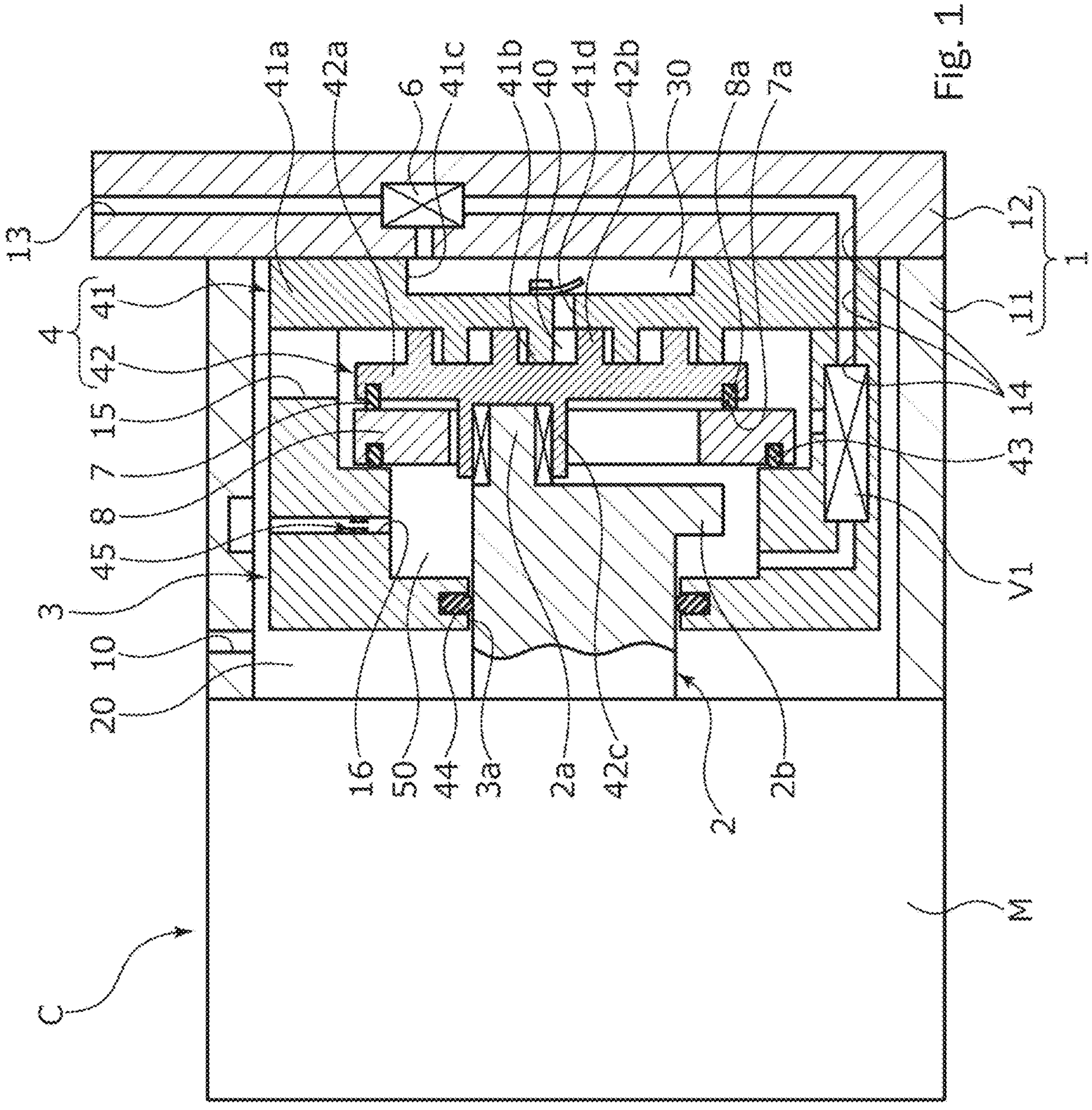
FIG. 1 is a schematic configuration diagram illustrating a scroll compressor to which a valve according to a first embodiment of the present invention is applied.

A valve according to a first embodiment of the present invention will be described with reference to FIGS. 1 to 3. The valve is applied to a scroll compressor C that suctions, compresses, and discharges a refrigerant serving as a fluid to be used in a rotating machine including an eccentric mechanism, for example, an air conditioning system of an automobile, etc. It is noted that in the present embodiment, the refrigerant is a gas in a state mixed with a mist-shaped lubricating oil.

First, the scroll compressor C will be described. As illustrated in FIG. 1, the scroll compressor C is mainly configured by a housing 1, a rotating shaft 2, an inner casing 3, a scroll compression mechanism 4, a side seal 7, a thrust plate 8, and a drive motor M.

The housing 1 is configured by a cylindrical casing 11 and a cover 12 that closes an opening of the casing 11. An opening of the casing 11 on the axially opposite side of the opening to be closed by the cover 12 is closed by the drive motor M.

Inside the casing 11, a low-pressure chamber 20 to which a low-pressure refrigerant, that is, a suction fluid Ps is supplied through a suction port 10 from a refrigerant circuit (not illustrated), a high-pressure chamber 30 serving as a discharge chamber to which a high-pressure refrigerant compressed by the scroll compression mechanism 4, that is, a discharge fluid Pd is discharged, and a back pressure chamber 50 to which part of the refrigerant compressed by the scroll compression mechanism 4, that is, a control fluid Pb is supplied together with the lubricating oil via a control valve V1 are formed. It is noted that the back pressure chamber 50 is formed inside the cylindrical inner casing 3 housed inside the casing 11.

A discharge communication passage 13 providing communication between the refrigerant circuit (not illustrated) and the high-pressure chamber 30 is formed in the cover 12. In addition, part of a back pressure communication passage 14 providing communication between the high-pressure chamber 30 and the back pressure chamber 50 is formed in the cover 12 while branching from the discharge communication passage 13. It is noted that an oil separator 6 that separates the lubricating oil from the refrigerant is provided in the discharge communication passage 13.

The inner casing 3 is fixed in a state where an axial end portion is abutted with an end plate **41*a* of a stationary scroll 41 configuring the scroll compression mechanism 4. In addition, a suction communication passage 15 passing through in the radial direction is formed on a side wall of the inner casing 3. That is, the low-pressure chamber 20 is formed from an exterior of the inner casing 3 to an interior of the inner casing 3 via the suction communication passage 15. The suction fluid Ps supplied to the interior of the inner casing 3 through the suction communication passage 15 is suctioned into the scroll compression mechanism 4**.

The scroll compression mechanism 4 is mainly configured by the stationary scroll 41 fixed to the cover 12 in a sealed manner, and a movable scroll 42 housed inside the inner casing 3.

The stationary scroll 41 is made of metal, and includes a spiral wrap **41*b* provided to project toward the movable scroll 42 from a surface of the disc-shaped end plate 41*a*, that is, an end surface of the end plate 41*a* opposing the movable scroll 42. In addition, a recessed portion 41*c* in which the inner diameter side of a back surface of the end plate 41*a*, that is, an end surface of the end plate 41*a* abutted with the cover 12 is recessed in the opposite direction to the cover 12 is formed in the stationary scroll 41, and the high-pressure chamber 30 is defined by this recessed portion 41*c* and the cover 12**.

The movable scroll 42 is made of metal, and includes a spiral wrap **42*b* provided to project toward the stationary scroll 41 from a surface of a disc-shaped end plate 42*a*, that is, an end surface of the end plate 42*a* opposing the stationary scroll 41. In addition, a boss 42*c* projecting from center of a back surface of the end plate 42*a* is formed in the movable scroll 42. An eccentric portion 2*a* formed in the rotating shaft 2 is relatively rotatably inserted and fitted to the boss 42*c*. It is noted that in the present embodiment, an eccentric mechanism that eccentrically rotates the rotating shaft 2 is configured by the eccentric portion 2*a* of the rotating shaft 2 and a counterweight portion 2*b* projecting in the outer diameter direction from the rotating shaft 2**.

When the rotating shaft 2 is driven and rotated by the drive motor M, the eccentric portion **2*a* is eccentrically rotated, and the movable scroll 42 relatively slides with eccentric rotation in a state where the movable scroll 42 is held in a posture with respect to the stationary scroll 41. At this time, the movable scroll 42 is eccentrically rotated with respect to the stationary scroll 41, and along with this rotation, a contact position of the wraps 41*b*, 42*b* is successively moved in the rotating direction, and a compression chamber 40 formed between the wraps 41*b*, 42*b* is gradually downsized while moving toward center. Thereby, the suction fluid Ps suctioned into the compression chamber 40 from the low-pressure chamber 20 formed on the outer diameter side of the scroll compression mechanism 4 is gradually compressed, and finally, the high-pressure discharge fluid Pd is discharged to the high-pressure chamber 30 through a discharge hole 41***d* provided in center of the stationary scroll 41.

The side seal 7 is made of resin, and is formed in a rectangular shape in a sectional view and a ring shape in a view in the axial direction, and fixed to the back surface of the end plate 42*a* of the movable scroll 42. A sliding surface 7*a* to be abutted with a sliding surface 8*a* formed in the thrust plate 8 is formed in the side seal 7.

The thrust plate 8 is made of metal and formed in a ring shape, and a seal ring 43 is fixed to the thrust plate 8. The seal ring 43 is abutted with an inner peripheral end surface of the inner casing 3. Thereby, the thrust plate 8 functions as a thrust bearing that receives an axial load of the movable scroll 42 via the side seal 7.

In addition, inside the inner casing 3, the side seal 7 and the seal ring 43 partition the low-pressure chamber 20 formed on the outer diameter side of the movable scroll 42 and the back pressure chamber 50 formed on the back surface side of the movable scroll 42. The back pressure chamber 50 is formed as a sealed space by sealing a portion between the back pressure chamber 50 and the rotating shaft 2 inserted into a through hole 3*a* by a seal ring 44 fixed to an inner periphery of the through hole 3*a* which is provided in center of the inner casing 3.

In addition, the control valve V1 serving as a valve is provided in the back pressure communication passage 14 formed over the cover 12, the stationary scroll 41, and the inner casing 3, the back pressure communication passage providing communication between the high-pressure chamber 30 and the back pressure chamber 50.

Part of the discharge fluid Pd of the high-pressure chamber 30 supplied to the control valve V1 together with the lubricating oil separated in the oil separator 6 is pressure-adjusted to the control fluid Pb and supplied to the back pressure chamber 50.

It is noted that a depressurizing hole 16 passing through in the radial direction and providing communication between the low-pressure chamber 20 and the back pressure chamber 50 is formed in the inner casing 3, and an orifice 45 is provided in the depressurizing hole 16.

Next, the control valve V1 serving as the valve in the present embodiment will be described by using FIGS. 2 and 3. Hereinafter, the right and left sides seen from the front surface side of FIGS. 2 and 3 will be described as the right and left sides of the control valve.

Figure 2:
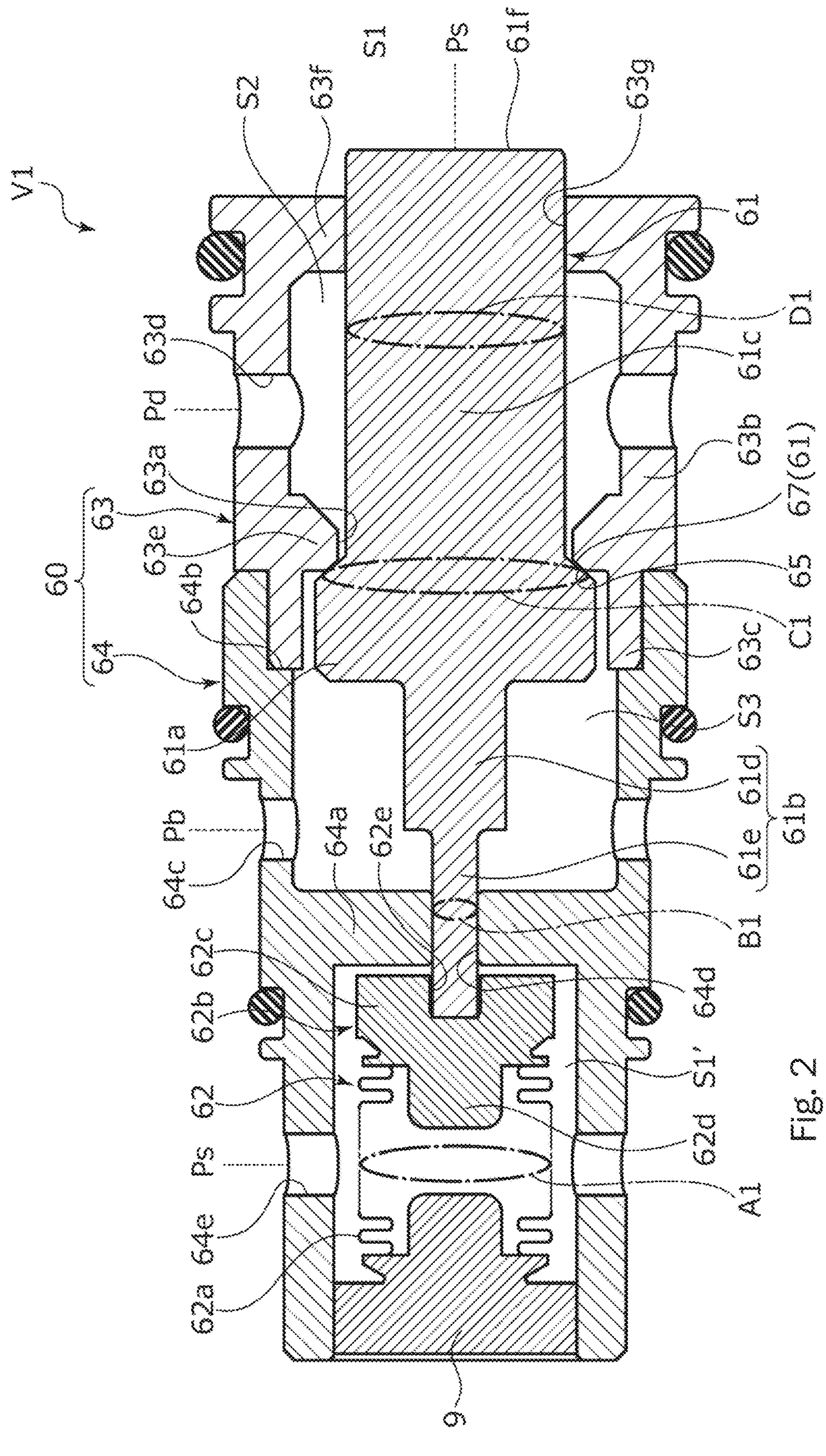
FIG. 2 is a sectional view illustrating a valve-closed state of the valve in the first embodiment of the present invention.

As illustrated in FIG. 2, the control valve V1 of the first embodiment is mainly configured by a housing 60, a valve member 61 serving as a valve element, and a bellows 62 serving as a bias member that biases the valve member 61 in the seating direction, that is, the valve closing direction.

The housing 60 partitions two first spaces S1, S1' communicating with the low-pressure chamber 20, a second space S2 communicating with the high-pressure chamber 30, and a third space S3 communicating with the back pressure chamber 50. This housing 60 includes a valve hole 63*a* providing communication between the second space S2 and the third space S3. It is noted that the housing 60 may partition at least some of the first spaces S1, S1', the second space S2, and the third space S3.

This housing 60 is configured by a first division body 63 and a second division body 64. The first division body 63 includes a tubular base portion 63*b* and an annular projected portion 63*c*.

A communication hole 63*d* passing through in the radial direction and communicating with the high-pressure chamber 30 is provided in the tubular base portion 63*b*. A partition wall portion 63*e* extending on the inner diameter side is provided in a left end of the tubular base portion 63*b*, and the valve hole 63*a* is provided in the partition wall portion 63*e*. A tapered surface that increases a diameter of the valve hole 63*a* leftward is formed on a left surface of the partition wall portion 63*e*, and the tapered surface serves as a valve seat 65 to and from which a large diameter portion 61*a* of the valve member 61 to be described later is connected and separated. That is, a valve that open-close controls a passing flow rate and a flow passage by connecting and separating the housing 60 and the valve member 61 is formed.

In addition, a partition wall portion 63*f* extending on the inner diameter side is provided in a right end of the tubular base portion 63*b*, and a through hole 63*g* is provided in the partition wall portion 63*f*. A space surrounded by an inner peripheral surface of the tubular base portion 63*b*, the partition wall portion 63*e*, and the partition wall portion 63*f* serves as the second space S2 into which the discharge fluid Pd flows. In addition, a space on the axially right side of the partition wall portion 63*f* serves as the first space S1 on one side into which the suction fluid Ps flows. Specifically, the first space S1 on one side is partitioned by the partition wall portion 63*f* and an installment recessed portion of the control valve V1 provided in the stationary scroll 41.

The annular projected portion 63*c* projects leftward from a left end of the tubular base portion 63*b*, and has a smaller diameter than the tubular base portion 63*b*. That is, the tubular base portion 63*b* and the annular projected portion 63*c* form a step portion.

The second division body 64 is formed in a tubular shape, and a partition wall portion 64*a* that partitions the third space S3 and the first space S1' on the other side is formed in a substantially central portion in the right and left direction. A through hole 64*d* is formed in this partition wall portion 64*a*.

An annular step portion 64*b* is formed on an inner peripheral surface of a right end opening portion of the second division body 64, and the annular projected portion 63*c* of the first division body 63 is fitted to this annular step portion 64*b*.

A space surrounded by an inner peripheral surface of a part of the second division body 64 on the axially right side of the partition wall portion 64*a*, the partition wall portion 64*a*, an inner peripheral surface of the annular projected portion 63*c* in the first division body 63, and the partition wall portion 63*e* serves as the third space S3 into which the control fluid Pb flows.

On the right side of the partition wall portion 64*a* in the second division body 64, a communication hole 64*c* passing through in the radial direction and communicating with the back pressure chamber 50 is provided. In addition, on the left side of the partition wall portion 64*a* in the second division body 64, a communication hole 64*e* passing through in the radial direction and communicating with the low-pressure chamber 20 is provided.

A lid member 9 whose axial position is adjustable with respect to the second division body 64 is screwed and attached to an inner peripheral surface of a left end opening portion of the second division body 64. It is noted that the lid member 9 may be fixed to the second division body 64 not only by screwing but also by various fixing means. However, it is preferable that the axial position is adjustable.

A space surrounded by an inner peripheral surface of a part of the second division body 64 on the left side of the partition wall portion 64*a*, the partition wall portion 64*a*, and the lid member 9 serves as the first space S1' on the other side into which the suction fluid Ps flows.

The bellows 62 extendable and contractable in the axial direction is arranged between the lid member 9 and the valve member 61 to be described later. The bellows 62 is configured by a zigzag-shaped trunk portion 62*a* made of metal, and a closing portion 62*b* that closes an opening of an axially right end of the trunk portion 62*a*, and an interior is held in vacuum. It is noted that an opening of an axially left end of the trunk portion 62*a* is closed by the lid member 9. Further, it is noted that the vacuum in the present invention indicates the "state of a space filled with a gas of lower pressure than normal atmospheric pressure" as defined by Japanese Industrial Standards (JIS Z 8126).

The closing portion 62*b* has a disc-shaped base portion 62*c*, and a leading end shaft portion 62*d* projecting on the axially left side from the base portion 62*c* with a small diameter. A recessed portion 62*e* recessed on the axially left side is formed in a central portion of a surface on the axially right side of the base portion 62*c*. In addition, the leading end shaft portion 62*d* is inserted into the inside of the trunk portion 62*a*.

The valve member 61 includes a large diameter portion 61*a* provided in an axially central portion, a stepped small diameter portion 61*b* extending leftward in the axial direction from the large diameter portion 61*a*, and an extending shaft portion 61*c* extending rightward in the axial direction from the large diameter portion 61*a*.

The large diameter portion 61*a* is arranged in the third space S3. A surface on the axially right side of the large diameter portion 61*a* is substantially parallel to the valve seat 65, and is formed as a tapered surface 67 connectable to and separable from the valve seat 65. The tapered surface 67 and the valve seat 65 serve as a DB valve that adjusts pressure of the control fluid Pb by pressure of the discharge fluid Pd.

The stepped small diameter portion 61*b* is configured by a first shaft portion 61*d* projecting leftward in the axial direction from the large diameter portion 61*a* with a smaller diameter than the large diameter portion 61*a*, and a second shaft portion 61*e* projecting leftward in the axial direction from the first shaft portion 61*d* with a further smaller diameter. This second shaft portion 61*e* is inserted into the through hole 64*d* from the third space S3 side, and a leading end portion of the second shaft portion 61*e* is fitted and connected to the recessed portion 62*e* of the closing portion 62*b* in the first space S1'.

It is noted that a gap between an inner peripheral surface of the partition wall portion 64*a* configuring the through hole 64*d* and an outer peripheral surface of the second shaft portion 61*e* of the stepped small diameter portion 61*b* is extremely small. Thus, the refrigerant is scarcely moved between the third space S3 and the first space S1' via the gap. In addition, the inner peripheral surface of the partition wall portion 64*a* and the outer peripheral surface of the second shaft portion 61*e* are respectively flat surfaces, and both the surfaces slide with each other.

The extending shaft portion 61*c* extends rightward in the axial direction from the large diameter portion 61*a* and is inserted into the through hole 63*g*. The extending shaft portion 61*c* has a larger diameter than the first shaft portion 61*d* of the stepped small diameter portion 61*b*. An axially right end surface 61*f* of the extending shaft portion 61*c* serves as a pressure receiving surface that receives fluid pressure in the first space S1.

It is noted that a gap between an inner peripheral surface of the partition wall portion 63*f* configuring the through hole 63*g* and an outer peripheral surface of the extending shaft portion 61*c* is extremely small. Thus, the refrigerant is scarcely moved between the second space S2 and the first space S1 via the gap. In addition, the inner peripheral surface of the partition wall portion 63*f* and the outer peripheral surface of the extending shaft portion 61*c* are respectively flat surfaces.

As illustrated in FIG. 2, in a valve-closed state of the control valve V1, the closing portion 62*b* of the bellows 62 is arranged at a position separated on the axially left side from the partition wall portion 64*a*. That is, in the bellows 62, pressure of the suction fluid Ps in the first space S1' always acts leftward in the axial direction.

Next, opening and closing actions of the control valve V1 will be described. As illustrated in FIG. 2, with the axially left side serving as the positive side, a force ($F_{Ps}$) by the pressure of the suction fluid Ps in the first spaces S1, S1', a force ($F_{Pd}$) by the pressure of the discharge fluid Pd in the second space S2, a force ($F_{Pb}$) by the pressure of the control fluid Pb of the third space S3, a force ($F_{P0}$) by pressure of a fluid P0 in the bellows 62, and a bias force ($F_b$) of the bellows 62 act on the valve member 61 (that is, with the left side serving as the positive side, a force $F_v=F_{Ps}+F_{Pd}-F_{Pb}-F_{P0}-F_b$ acts on the valve member 61). It is noted that in a case where the fluid pressure in the bellows 62 is extremely small in comparison to other fluid pressure, such as vacuum, it is possible to regard that P0=0.

Specifically, the pressure of the suction fluid Ps of the first space S1 acts leftward in the axial direction with respect to an effective pressure receiving area D1 of the extending shaft portion 61*c*. Further, the pressure of the suction fluid Ps of the first space S1' acts leftward in the axial direction with respect to an area obtained by subtracting an effective pressure receiving area B1 of the second shaft portion 61*e* from an effective pressure receiving area A1 of the bellows 62. That is, with the axially left side serving as the positive side, the force ($F_{Ps}$)=Ps×(A1−B1+D1) by the pressure of the suction fluid Ps acts on the valve member 61.

In addition, the pressure of the discharge fluid Pd of the second space S2 acts leftward in the axial direction with respect to an area obtained by subtracting the effective pressure receiving area D1 of the extending shaft portion 61*c* from an effective pressure receiving area C1 of the large diameter portion 61*a*. That is, with the axially left side serving as the positive side, the force ($F_{Pd}$)=Pd×(C1−D1) by the pressure of the discharge fluid Pd acts on the valve member 61.

It is noted that a pressure receiving surface (C1−D1) of the discharge fluid Pd is narrower than a pressure receiving surface (A1−B1+D1) of the suction fluid Ps (C1−D1<A1−B1+D1).

Meanwhile, the pressure of the control fluid Pb of the third space S3 acts rightward in the axial direction with respect to an area obtained by subtracting the effective pressure receiving area B1 of the second shaft portion 61*e* from the effective pressure receiving area C1 of the large diameter portion 61*a*. That is, with the axially right side serving as the positive side, the force ($F_{Pb}$)=Pb×(C1−B1) by the pressure of the control fluid Pb acts on the valve member 61.

In addition, the pressure of the fluid P0 in the bellows 62 acts on the effective pressure receiving area A1 of the bellows 62. That is, with the axially right side serving as the positive side, the force ($F_{P0}$)=P0×A1 by the pressure of the fluid P0 in the bellows 62 acts on the valve member 61.

It is noted that the pressure receiving surface (C1−D1) of the discharge fluid Pd is narrower than a pressure receiving surface (C1−B1) of the control fluid Pb (C1−D1<C1−B1).

That is, with the left side serving as the positive side, the expression of Pb={Pd×(C1−D1)+Ps×(A1−B1+D1)−P0×A1−Fb}/(C1−B1) is established.

In other words, as illustrated in FIG. 2, in a case where the sum of the force ($F_{Pd}$) by the pressure of the discharge fluid Pd and the force ($F_{Ps}$) by the pressure of the suction fluid Ps, the forces acting leftward in the axial direction is smaller than the sum of the force ($F_{Pb}$) by the pressure of the control fluid Pb, the force ($F_{P0}$) by the pressure of the fluid P0 in the bellows 62, and the bias force ($F_b$) of the bellows 62, the forces acting rightward in the axial direction, by pressing the valve member 61 rightward in the axial direction, that is, in the valve closing direction, the large diameter portion 61$a$ is seated on the valve seat 65, and the control valve V1 is brought into a valve-closed state.

Figure 3:
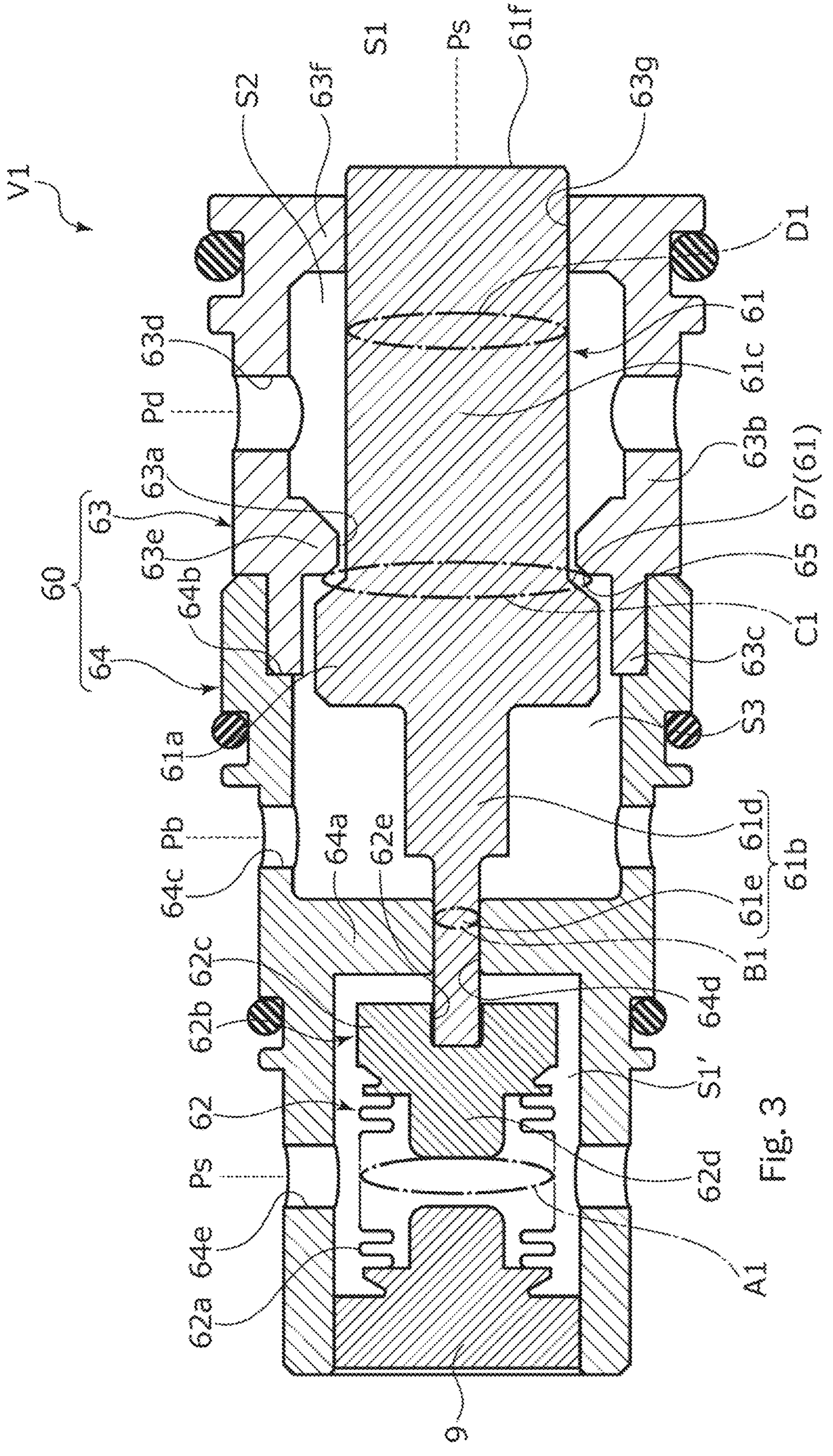
FIG. 3 is a sectional view illustrating a valve-opened state of the valve in the first embodiment of the present invention.

Meanwhile, as illustrated in FIG. 3, in a case where the sum of the force ($F_{Pd}$) by the pressure of the discharge fluid Pd and the force ($F_{Ps}$) by the pressure of the suction fluid Ps, the forces acting leftward in the axial direction is larger than the sum of the force ($F_{Pb}$) by the pressure of the control fluid Pb, the force ($F_{P0}$) by the pressure of the fluid P0 in the bellows 62, and the bias force ($F_b$) of the bellows 62, the forces acting rightward in the axial direction, by pressing the valve member 61 leftward in the axial direction, that is, in the valve opening direction, the large diameter portion 61$a$ is separated from the valve seat 65, and the control valve V1 is brought into a valve-opened state.

As described above, an opening degree of the control valve V1 is adjusted by a balance between the sum of the force ($F_{Pd}$) by the pressure of the discharge fluid Pd and the force ($F_{Ps}$) by the pressure of the suction fluid Ps, and the sum of the force ($F_{Pb}$) by the pressure of the control fluid Pb, the force ($F_{P0}$) by the pressure of the fluid P0 in the bellows 62, and the bias force ($F_b$) of the bellows 62. Thus, it is possible to smoothly change the valve opening degree in accordance with a change in the pressure of the high-pressure chamber 30 and the low-pressure chamber 20, and instantly adjust the pressure of the back pressure chamber 50.

In addition, the bias force ($F_b$) of the bellows 62 acts rightward in the axial direction with respect to the valve member 61. According to this, in a valve-closed state of the control valve V1, a backlash does not easily occur in the valve member 61. In addition, by changing the bias force ($F_b$) of the bellows 62 at the time of design, it is possible to appropriately change set pressure with which the valve member 61 is operated. Thus, the valve opening degree is easily adjusted. It is noted that by adjusting a position of the lid member 9 with respect to the second division body 64 in the axial direction, it is possible to simply and easily adjust the bias force ($F_b$) of the bellows 62.

In addition, the pressure receiving surface (C1−D1) of the discharge fluid Pd is narrower than the pressure receiving surface (A1−B1+D1) of the suction fluid Ps (C1−D1<A1−B1+D1). Thus, while suppressing an influence on the valve member 61 by the pressure of the discharge fluid Pd whose pressure is higher than the suction fluid Ps, it is possible to relatively increase an influence by the pressure of the suction fluid Ps. According to this, it is possible to suppress that the valve member 61 is radically moved by a radical pressure change of the discharge fluid Pd.

In addition, the pressure receiving surface (C1−D1) of the discharge fluid Pd is narrower than the pressure receiving surface (C1−B1) of the control fluid Pb (C1−D1<C1−B1). Thus, while suppressing the influence on the valve member 61 by the pressure of the discharge fluid Pd whose pressure is higher than the control fluid Pb, it is possible to relatively increase an influence by the pressure of the control fluid Pb. According to this, it is possible to suppress that the valve member 61 is radically moved by a radical pressure change of the discharge fluid Pd.

In addition, the first spaces S1, S1' are provided in both axial ends of the housing 60. In the first space S1 on one side, the axially right end surface 61$f$ of the extending shaft portion 61$c$ extending from the large diameter portion 61$a$ is arranged. In addition, in the first space S1' on the other side, the bellows 62 fixed to the second shaft portion 61$e$ extending from the large diameter portion 61$a$, the bellows being extendable and contractable in the axial direction is arranged. According to this, by the right end surface 61$f$ of the extending shaft portion 61$c$ and a pressure receiving surface of the bellows 62, it is possible to receive the pressure of the suction fluid Ps. Thus, the valve member 61 is easily separated from the valve seat 65.

In addition, the housing 60 includes the first division body 63 in which the second space S2, the first space S1 on one side, and the valve seat 65 are provided, and the second division body 64 in which the first space S1' on the other side is provided, and the third space S3 is formed between the first division body 63 and the second division body 64 coupled to each other in the axial direction. According to this, it is possible to assemble the first division body 63 and the second division body 64 after the second shaft portion 61$e$ of the valve member 61 is inserted into the through hole 64$d$ of the second division body 64. Thus, the control valve V1 is easily assembled.

It is noted that although the present embodiment exemplifies the mode in which the bellows 62 has the bias force, a bias member such as a spring may be arranged in parallel to the trunk portion of the bellows.

In addition, although not directly illustrated, as a modified example of the present embodiment, for example, a bias member that biases the valve member 61 in the valve opening direction from the valve seat 65 may be arranged, for example, between the large diameter portion 61$a$ in the valve member 61 and the partition wall portion 63$e$ in the housing 60.

With such a configuration, a bias force ($F_{sp}$) of the bias member acts on the valve member 61 in the valve opening direction from the valve seat 65 (that is, with the left side serving as the positive side, a force $F_v=F_{Ps}+F_{Pd}-F_{Pb}-F_{P0}-F_b+F_{sp}$ acts on the valve member 61). That is, with the left side serving as the positive side, the expression of Pb={Pd×(C1−D1)+Ps×(A1−B1+D1)−P0×A1−$F_b$+$F_{sp}$}/(C1−B1) is established.

In such a way, in comparison to the configuration of the present embodiment in which the bias member that biases the valve member 61 in the valve opening direction from the valve seat 65 is not provided, the valve member 61 is easily moved in the valve opening direction. That is, the valve opening degree is easily adjusted by the bias member.

Second Embodiment

Next, a valve according to a second embodiment of the present invention will be described with reference to FIG. 4. It is noted that duplicated configurations which are the same configurations as the embodiment described above will not be described.

Figure 4:
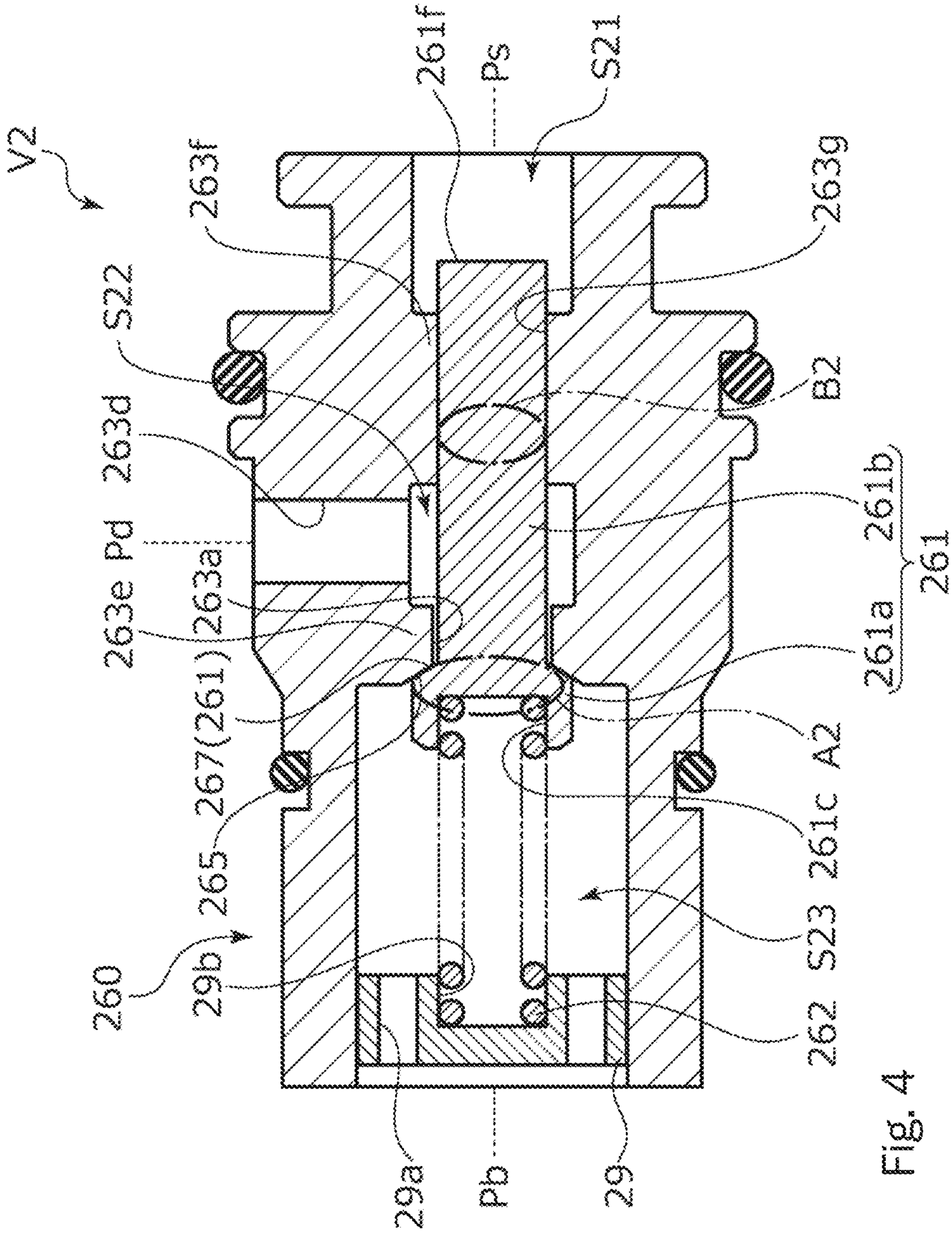
FIG. 4 is a sectional view illustrating a valve according to a second embodiment of the present invention.

As illustrated in FIG. 4, a control valve V2 in the second embodiment is mainly configured by a housing 260, a valve member 261, and a spring 262 serving as a bias member.

The housing 260 includes a first space S21 communicating with the low-pressure chamber 20, a second space S22 communicating with the high-pressure chamber 30, a third space S23 communicating with the back pressure chamber 50, a valve hole 263*a* providing communication between the second space S22 and the third space S23, and a through hole 263*g* providing communication between the first space S21 and the second space S22.

The first space S21 is provided and recessed so as to be open on the axially right side with respect to the housing 260. This first space S21 is partitioned from the second space S22 by a partition wall portion 263*f* having the through hole 263*g*.

The second space S22 is a hollow space provided in a substantially central portion in the axial direction of the housing 260, and communicates with the high-pressure chamber 30 through a communication hole 263*d* passing through in the radial direction.

The third space S23 is provided and recessed so as to be open on the axially left side with respect to the housing 260. This third space S23 is partitioned from the second space S22 by a partition wall portion 263*e* having the valve hole 263*a*.

A lid member 29 is screwed and attached to an inner peripheral surface of a left end opening portion of the housing 260 configuring the third space S23. A plurality of through holes 29*a* passing through in the axial direction are provided in the lid member 29, and the third space S23 and the back pressure chamber 50 communicate with each other through the through holes 29*a*. In addition, a recessed portion 29*b* which is open on the right side is provided on a right surface of the lid member 29.

The valve member 261 includes a large diameter portion 261*a* arranged in the third space S23, and a small diameter portion 261*b* extending rightward in the axial direction from the large diameter portion 261*a*.

The large diameter portion 261*a* has a larger diameter than the valve hole 263*a*, and a tapered surface 267 to be connected to and separated from a taper-shaped valve seat 265 provided on a left surface of the partition wall portion 263*e* is provided on a right surface of the large diameter portion 261*a*. In addition, a recessed portion 261*c* which is open on the left side is provided on a left surface of the large diameter portion 261*a*.

The small diameter portion 261*b* is inserted into the valve hole 263*a*, the second space S22, and the through hole 263*g*, and a right end surface 261*f* is arranged in the first space S21.

The spring 262 is a compression spring, a right end portion is fitted to the recessed portion 261*c* of the valve member 261, and a left end portion is arranged and fitted to the recessed portion 29*b* of the lid member 29. By changing a position of the lid member 29 with respect to the housing 260, it is possible to change a bias force of the spring 262.

With the axially left side serving as the positive side, a force ($F_{Ps}$) by the pressure of the suction fluid Ps in the first space S21, a force ($F_{Pd}$) by the pressure of the discharge fluid Pd in the second space S22, a force ($F_{Pb}$) by the pressure of the control fluid Pb of the third space S23, and a bias force ($F_{sp}$) of the spring 262 act on the valve member 261 (that is, with the left side serving as the positive side, a force $F_v=F_{Ps}+F_{Pd}-F_{Pb}-F_{sp}$ acts on the valve member 261).

The pressure of the suction fluid Ps of the first space S21 acts leftward in the axial direction with respect to an effective pressure receiving area B2 of the small diameter portion 261*b*. That is, with the axially left side serving as the positive side, the force ($F_{Ps}$)=Ps×B2 by the pressure of the suction fluid Ps acts on the valve member 261.

In addition, the pressure of the discharge fluid Pd of the second space S22 acts leftward in the axial direction with respect to an area obtained by subtracting the effective pressure receiving area B2 of the small diameter portion 261*b* from an effective pressure receiving area A2 of the large diameter portion 261*a*. That is, with the axially left side serving as the positive side, the force ($F_{Pd}$)=Pd×(A2−B2) by the pressure of the discharge fluid Pd acts on the valve member 261.

Meanwhile, the pressure of the control fluid Pb of the third space S23 acts rightward in the axial direction with respect to the effective pressure receiving area A2 of the large diameter portion 261*a*. That is, with the axially right side serving as the positive side, the force ($F_{Pb}$)=Pb×A2 by the pressure of the control fluid Pb acts on the valve member 261.

That is, with the left side serving as the positive side, the expression of $Pb=\{Pd\times(A2-B2)+Ps\times B2-F_{sp}\}/A2$ is established.

Regarding the control valve V2 of the second embodiment, the number of parts is small. Thus, it is possible to inexpensively manufacture the control valve V2 and assembling is simple and easy. In addition, it is possible to use the control valve V2 of the second embodiment even under a high-pressure environment where the control valve V1 using the bellows 62 as in the first embodiment cannot be used (for example, in a case where a CO2 refrigerant is used, etc.)

It is noted that although not directly illustrated, as well as the modified example of the first embodiment, a bias member that biases the valve member 261 in the valve opening direction from the valve seat 265 may be arranged.

With such a configuration, a bias force ($F_{sp2}$) of the bias member acts on the valve member 261 in the valve opening direction from the valve seat 265 (that is, with the left side serving as the positive side, a force $F_v=F_{Ps}+F_{Pd}-F_{Pb}-F_{sp}+F_{sp2}$ acts on the valve member 261). That is, with the left side serving as the positive side, the expression of $Pb=\{Pd\times(A2-B2)+Ps\times B2-F_{sp}+F_{sp2}\}/A2$ is established.

In such a way, in comparison to the configuration of the present embodiment, the valve member 261 is easily moved in the valve opening direction. That is, a valve opening degree is easily adjusted by the bias member.

Third Embodiment

Next, a valve according to a third embodiment of the present invention will be described with reference to FIG. 5. It is noted that duplicated configurations which are the same configurations as the first embodiment will not be described.

Figure 5:
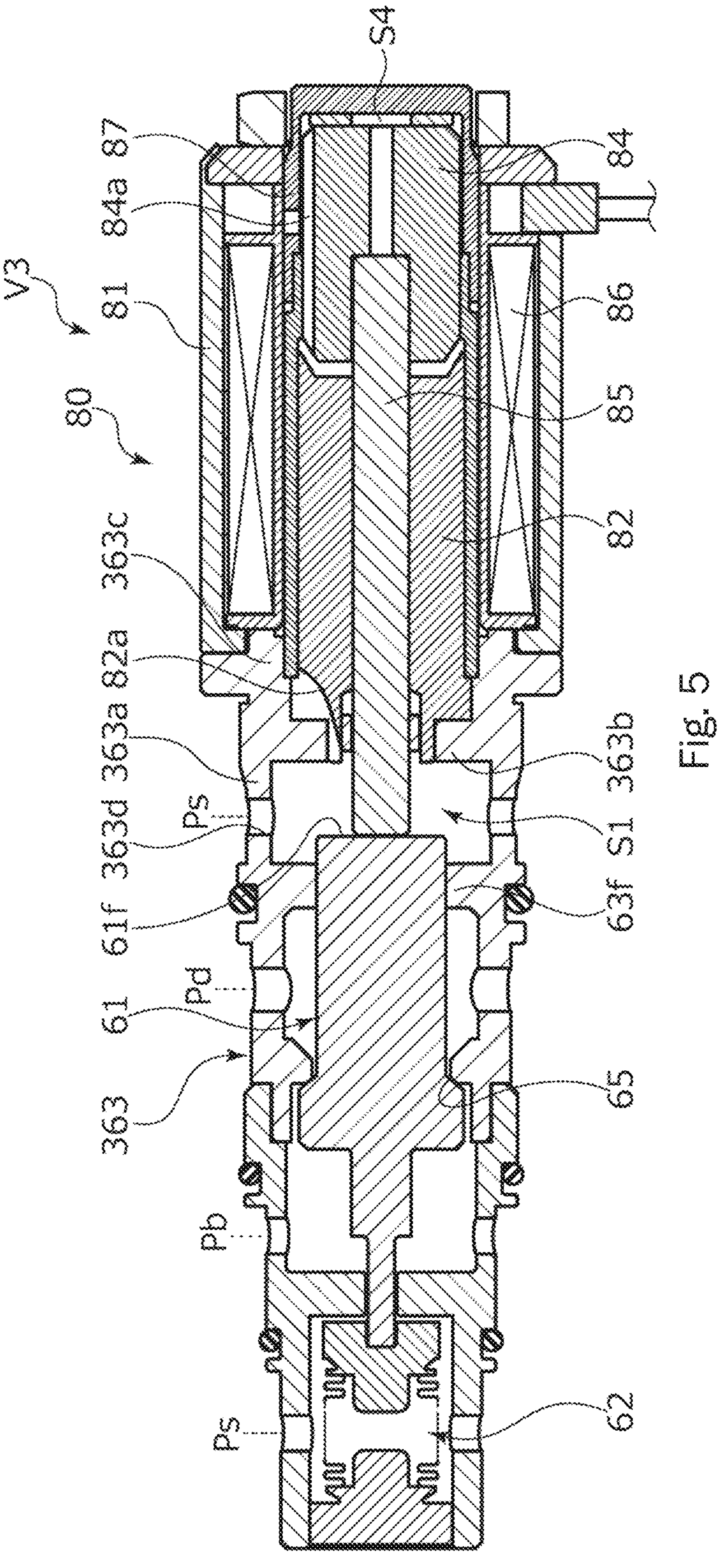
FIG. 5 is a sectional view illustrating a valve according to a third embodiment of the present invention.

As illustrated in FIG. 5, a control valve V3 in the third embodiment has the substantially same configuration as the control valve V1 except for a structure of a right end portion of a first division body 363 and a structure of a solenoid 80 serving as a drive source.

The control valve V3 of the third embodiment includes a tubular portion 363*a* extending rightward in the axial direction, a partition wall portion 363*b* extending in the inner diameter direction from a right end portion of the tubular portion 363*a*, and a tubular portion 363*c* extending rightward in the axial direction further from the partition wall portion 363*b* on the axially right side of a partition wall portion 63*f* in the first division body 363.

A first space S1 is partitioned by the partition wall portion 63*f*, the tubular portion 363*a*, and the partition wall portion 363*b*. In addition, a communication hole 363*d* communicating with the low-pressure chamber 20 is formed in the tubular portion 363*a* while passing through in the radial direction.

The solenoid 80 is mainly configured by a casing 81 connected to the tubular portion 363*c*, a substantially cylindrical center post 82 arranged on the inner diameter side of the casing 81, a rod 85 inserted into the center post 82 reciprocatably in the axial direction, in which an axially left end portion is arranged in the first division body 363, a movable iron core 84 to which an axially right end portion of the rod 85 is inserted, fitted, and fixed, a coil 86 for excitation wound on the outer side of the center post 82 via a bobbin, and a tubular bottomed sleeve 87 in which part of the center post 82, the movable iron core 84, and part of the rod 85 are housed.

A communication passage 82*a* providing communication between a communication space S4 on the axially right side of the center post 82 and the first space S1 is formed in the center post 82.

In addition, the movable iron core 84 is arranged movably in the axial direction in the communication space S4, and a communication passage 84*a* providing communication between both axial sides of the movable iron core 84 is formed. In such a way, the suction fluid Ps flows into both the axial sides of the movable iron core 84. Thus, an action of the movable iron core 84 is not influenced by the suction fluid Ps in the communication space S4.

In addition, the axially left end portion in the rod 85 is not fixed but abutted with an axially right end surface 61*f* of a valve member 61. That is, the rod 85 is connectable to and separable from the valve member 61 in the axial direction.

In a non-energized state of the control valve V3, by pressing the valve member 61 rightward in the axial direction by a bias force of a bellows 62, the control valve V3 is brought into a valve-closed state where a large diameter portion 61*a* is in contact with a valve seat 65.

In addition, in the control valve V3, by applying an electric current in accordance with an operation state of the scroll compressor C such as the rotating number to the solenoid 80, the movable iron core 84 is pulled to the center post 82 side, that is, the axially left side, and by moving the rod 85 fixed to the movable iron core 84 and the valve member 61 leftward in the axial direction, that is, in the valve opening direction together, the large diameter portion 61*a* is separated from the valve seat 65, and the control valve V3 is opened. In such a way, by applying the electric current in accordance with the operation state of the scroll compressor C to the solenoid 80, it is possible to enhance responsiveness of the control valve V3 in the valve opening direction in comparison to a valve having no solenoid 80, and it is also possible to enhance control stability.

In addition, the rod 85 is connectable to and separable from the valve member 61 in the axial direction. Thus, it is possible to prevent that the rod 85 influences an action of the valve member 61 after the large diameter portion 61*a* is separated from the valve seat 65.

It is noted that although the third embodiment exemplifies the mode in which the electric current in accordance with the rotating number of the scroll compressor C is applied to the solenoid 80, an electric current may be applied to the solenoid 80 in accordance with an operation command to the scroll compressor C.

Fourth Embodiment

Next, a valve according to a fourth embodiment of the present invention will be described with reference to FIG. 6. It is noted that duplicated configurations which are the same configurations as the second embodiment will not be described.

Figure 6:
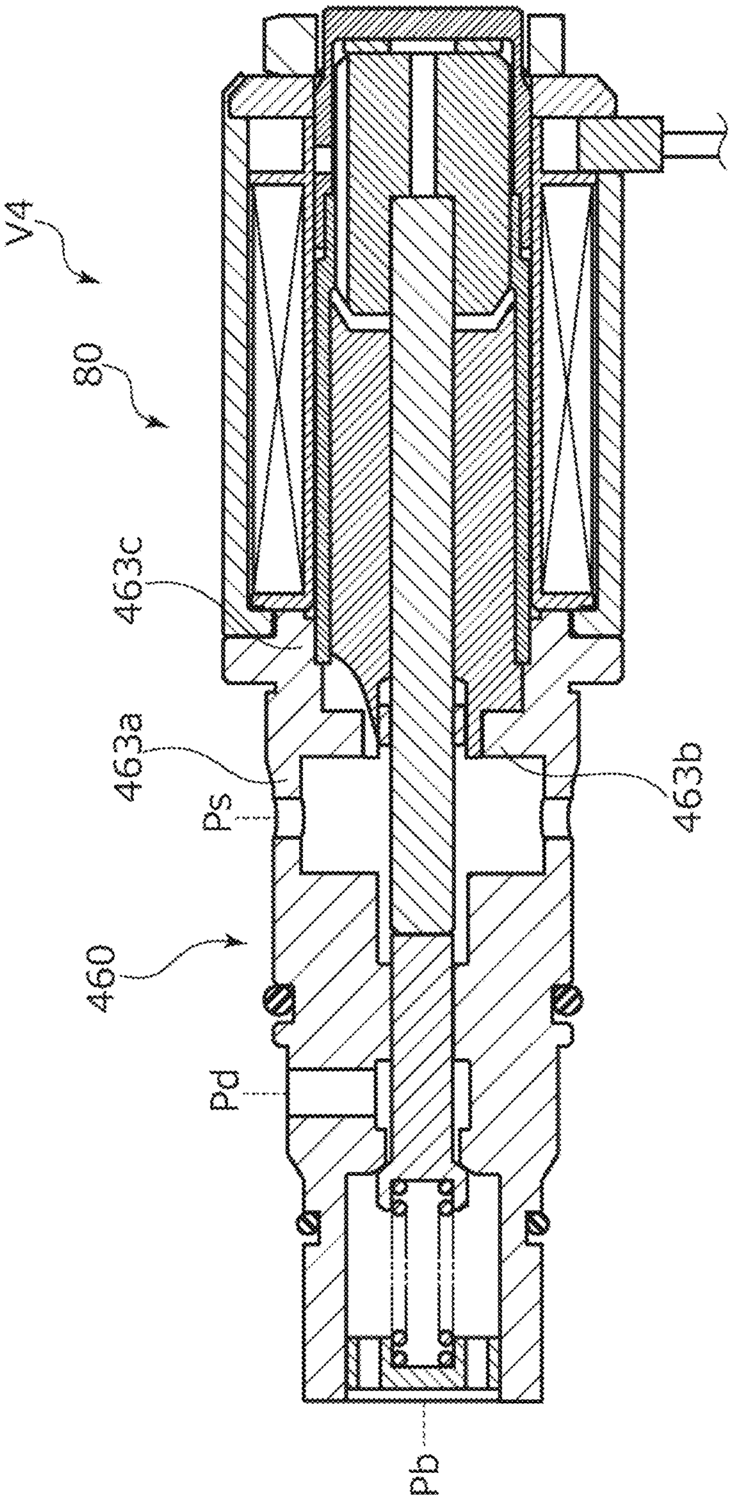
FIG. 6 is a sectional view illustrating a valve according to a fourth embodiment of the present invention.

As illustrated in FIG. 6, a control valve V4 in the fourth embodiment has the substantially same configuration as the control valve V2 except for a structure of a right end portion of a housing 460 and a structure of a solenoid 80 serving as a drive source.

A tubular portion 463*a* extending rightward in the axial direction, a partition wall portion 463*b* extending in the inner diameter direction from a right end portion of the tubular portion 463*a*, and a tubular portion 463*c* extending rightward in the axial direction further from the partition wall portion 463*b* are provided on the axially right side of the housing 460. The solenoid 80 is connected to the tubular portion 463*c*.

With the control valve V4, it is possible to bring the control valve V4 into a valve-opened state by applying an electric current in accordance with the rotating number of the scroll compressor C or the pressure of the discharge fluid Pd and the pressure of the suction fluid Ps to the solenoid 80.

Fifth Embodiment

Figure 7:
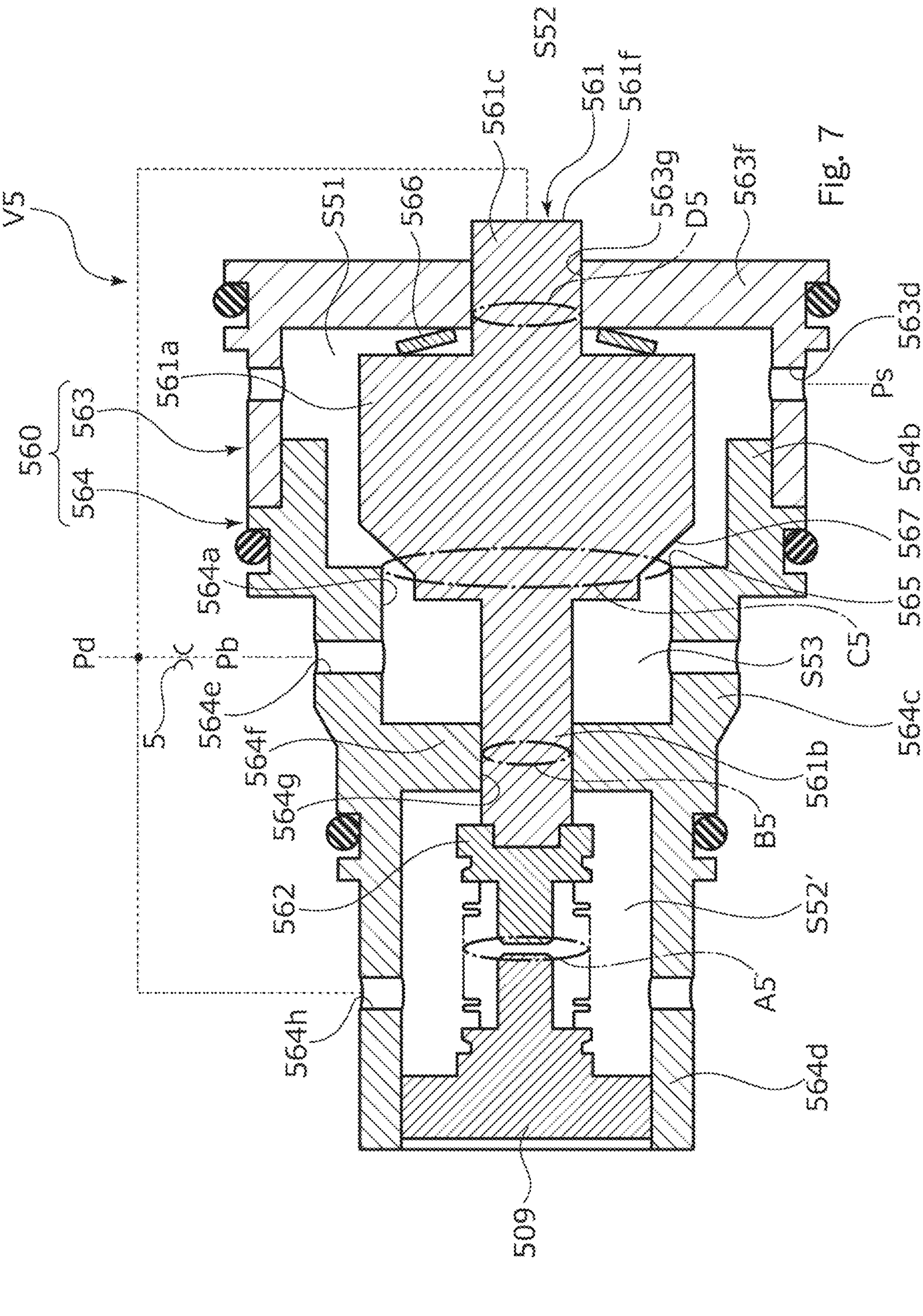
FIG. 7 is a sectional view illustrating a valve according to a fifth embodiment of the present invention.

Next, a valve according to a fifth embodiment of the present invention will be described with reference to FIG. 7. It is noted that duplicated configurations which are the same configurations as the first embodiment will not be described.

In a scroll compressor to which a control valve V5 in the fifth embodiment is applied, a high-pressure chamber 30 and a back pressure chamber 50 communicate with each other via an orifice 5.

The control valve V5 is mainly configured by a housing 560, a valve member 561, a bellows 562 serving as a bias member that biases the valve member 561 in the valve opening direction, and a disc spring 566 serving as a bias member that biases the valve member 561 in the valve closing direction.

The housing 560 is configured by a first division body 563 and a second division body 564. The first division body 563 is fitted and fixed onto a right end of a large diameter cylindrical portion 564*b* in the second division body 564, and a space surrounded by these serves as a first space S51 into which the suction fluid Ps flows.

In addition, a communication hole 563*d* communicating with a low-pressure chamber 20 is provided on a peripheral wall of the first division body 563. A partition wall portion 563*f* and a through hole 563*g* are provided in a right end of the first division body 563. A space on the axially right side of the partition wall portion 563*f* serves as a second space S52 on one side into which the discharge fluid Pd flows.

The second division body 564 includes the large diameter cylindrical portion 564*b*, a middle diameter cylindrical portion 564*c*, and a small diameter cylindrical portion 564*d*.

A right end of the middle diameter cylindrical portion 564*c* is positioned on the inner diameter side of a left end in the large diameter cylindrical portion 564*b* and continues to the left end. A valve hole 564*a* is provided in the right end in this middle diameter cylindrical portion 564*c*. The valve hole 564*a* provides communication between the first space S51 and a third space S53. A corner on the right end inner diameter side in the middle diameter cylindrical portion 564*c* serves as a valve seat 565.

In addition, a communication hole 564*e* communicating with the back pressure chamber 50 is provided on a peripheral wall of the middle diameter cylindrical portion 564*c*. A partition wall portion 564*f* and a through hole 564*g* are provided in a left end of the middle diameter cylindrical portion 564*c*. A space surrounded by the middle diameter cylindrical portion 564*c* serves as the third space S53 into which the control fluid Pb flows.

A space surrounded by the small diameter cylindrical portion 564*d* and a lid member 509 serves as a second space S52' on the other side into which the discharge fluid Pd flows. A communication hole 564*h* communicating with the high-pressure chamber 30 is provided on a peripheral wall of the small diameter cylindrical portion 564*d*.

The valve member 561 includes a large diameter portion 561*a*, a small diameter portion 561*b*, and an extending shaft portion 561*c*.

The large diameter portion 561*a* is arranged in the first space S51. The disc spring 566 is arranged between the large diameter portion 561*a* and the partition wall portion 563*f* of the first division body 563. It is noted that the bias member that biases the valve member 561 in the valve closing direction is not limited to the disc spring 566 but may be a compression spring, may be a plate spring, may be a bellows, or may be appropriately changed.

In addition, a surface on the axially left side of the large diameter portion 561*a* serves as a tapered surface 567 connectable to and separable from the valve seat 565, and together with the valve seat 565 by discharging the control fluid Pb to the low-pressure chamber 20, serves as a valve that adjusts the pressure of the control fluid Pb.

The small diameter portion 561*b* is inserted into the through hole 564*g* and connected to the bellows 562 in the second space S52'.

The extending shaft portion 561*c* is inserted into the through hole 563*g*. The extending shaft portion 561*c* has a larger diameter than the small diameter portion 561*b*. An axially right end surface 561*f* of the extending shaft portion 561*c* serves as a pressure receiving surface that receives fluid pressure in the second space S52.

Next, opening and closing actions of the control valve V5 will be described. With the axially left side serving as the positive side, a force ($F_{Ps}$) by the pressure of the suction fluid Ps in the first space S51, a force ($F_{Pd}$) by the pressure of the discharge fluid Pd in the second spaces S52, S52', a force ($F_{Pb}$) by the pressure of the control fluid Pb of the third space S53, a force ($F_{P0}$) by the pressure of fluid P0 in the bellows 562, a bias force ($F_b$) of the bellows 562, and a bias force ($F_{sp}$) of the disc spring 566 act on the valve member 561 (that is, with the left side serving as the positive side, a force $F_v = F_{Ps} + F_{Pd} - F_{Pb} - F_{P0} - F_b + F_{sp}$ acts on the valve member 561).

Specifically, the pressure of the suction fluid Ps of the first space S51 acts leftward in the axial direction with respect to an area obtained by subtracting an effective pressure receiving area D5 of the extending shaft portion 561*c* from an effective pressure receiving area C5 of the large diameter portion 561*a*. That is, with the axially left side serving as the positive side, the force ($F_{Ps}$)=Ps×(C5−D5) by the pressure of the suction fluid Ps acts on the valve member 561.

In addition, the pressure of the discharge fluid Pd of the second space S52 acts leftward in the axial direction with respect to the effective pressure receiving area D5 of the extending shaft portion 561*c*. Further, the pressure of the discharge fluid Pd of the second space S52' acts leftward in the axial direction with respect to an area obtained by subtracting an effective pressure receiving area B5 of the small diameter portion 561*b* from an effective pressure receiving area A5 of the bellows 562. That is, with the axially left side serving as the positive side, the force ($F_{Pd}$)=Pd×(A5−B5+D5) by the pressure of the discharge fluid Pd acts on the valve member 561.

It is noted that a pressure receiving surface (A5−B5+D5) of the discharge fluid Pd is narrower than a pressure receiving surface (C5−D5) of the suction fluid Ps (A5−B5+D5<C5−D5).

Meanwhile, the pressure of the control fluid Pb of the third space S53 acts rightward in the axial direction with respect to an area obtained by subtracting the effective pressure receiving area B5 of the small diameter portion 561*b* from the effective pressure receiving area C5 of the large diameter portion 561*a*. That is, with the axially right side serving as the positive side, the force ($F_{Pb}$)=Pb×(C5−B5) by the pressure of the control fluid Pb acts on the valve member 561.

In addition, the pressure of the fluid P0 in the bellows 562 acts on the effective pressure receiving area A5 of the bellows 562. That is, with the axially right side serving as the positive side, the force ($F_{P0}$)=P0×A5 by the pressure of the fluid P0 in the bellows 562 acts on the valve member 561.

It is noted that a pressure receiving surface (A5−B5+D5) of the discharge fluid Pd is narrower than a pressure receiving surface (C5−B5) of the control fluid Pb (A5−B5+D5<C5−B5).

That is, with the left side serving as the positive side, the expression of $Pb=\{Pd\times(A5-B5+D5)+Ps\times(C5-D5)-P0\times A5-F_b+F_{sp}\}/(C5-B5)$ is established.

In other words, in a case where the sum of the force ($F_{Pd}$) by the pressure of the discharge fluid Pd, the force ($F_{Ps}$) by the pressure of the suction fluid Ps, and the bias force ($F_{sp}$) of the disc spring 566, the forces acting leftward in the axial direction is smaller than the sum of the force ($F_{Pb}$) by the pressure of the control fluid Pb, the force ($F_{P0}$) by the pressure of the fluid P0 in the bellows 562, and the bias force ($F_b$) of the bellows 562, the forces acting rightward in the axial direction, by pressing the valve member 561 rightward in the axial direction, that is, in the valve opening direction, the large diameter portion 561*a* is separated from the valve seat 565, and the control valve V5 is brought into a valve-opened state.

Meanwhile, although not directly illustrated, in a case where the sum of the force ($F_{Pd}$) by the pressure of the discharge fluid Pd, the force ($F_{Ps}$) by the pressure of the suction fluid Ps, and the bias force ($F_{sp}$) of the disc spring 566, the forces acting leftward in the axial direction is larger than the sum of the force ($F_{Pb}$) by the pressure of the control fluid Pb, the force ($F_{P0}$) by the pressure of the fluid P0 in the bellows 562, and the bias force ($F_b$) of the bellows 562, the forces acting rightward in the axial direction, by pressing the valve member 561 leftward in the axial direction, that is, in the valve closing direction, the large diameter portion 561*a* is seated on the valve seat 565, and the control valve V5 is brought into a valve-closed state.

As described above, the control valve V5 has the configuration that the second spaces S52, S52' are arranged in both axial ends of the housing 560, and the valve member 561 can receive the pressure of the discharge fluid Pd respectively on both the axial end sides of the housing 560. Therefore, the valve member 561 is easily moved.

In addition, since the control valve V5 includes the bellows 562 and the disc spring 566, in comparison to the configuration only the bellows 62 is provided as in the first embodiment, a valve opening degree is easily adjusted.

It is noted that, although not directly illustrated, as a modified example of the present embodiment, the structure of the control valve may be simplified by omitting the disc spring 566.

With such a configuration, with the left side serving as the positive side, a force $F_v=F_{Ps}+F_{Pd}-F_{Pb}-F_{P0}-F_b$ acts on the valve member 561. That is, with the left side serving as the positive side, the expression of Pb={Pd×(C1−D1)+Ps×(A1−B1+D1)−P0×A5−$F_b$}/(C1−B1) is established.

Sixth Embodiment

Figure 8:
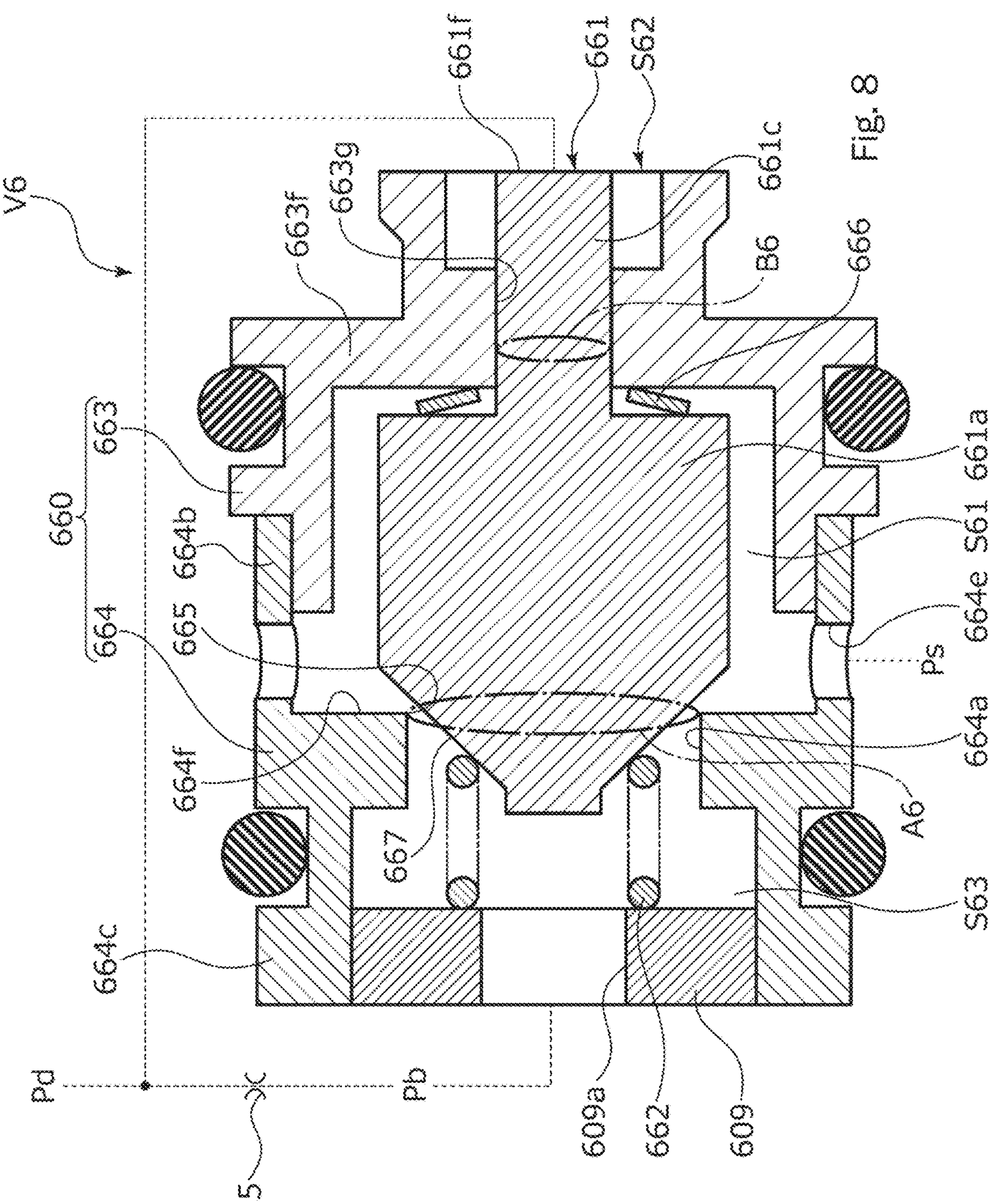
FIG. 8 is a sectional view illustrating a valve according to a sixth embodiment of the present invention.

Next, a valve according to a sixth embodiment of the present invention will be described with reference to FIG. 8. It is noted that duplicated configurations which are the same configurations as the second embodiment will not be described.

In a scroll compressor to which a control valve V6 in the sixth embodiment is applied, a high-pressure chamber 30 and a back pressure chamber 50 communicate with each other via an orifice 5.

The control valve V6 is mainly configured by a housing 660, a valve member 661, a compression spring 662 serving as a bias member that biases the valve member 661 in the valve opening direction, and a disc spring 666 serving as a bias member that biases the valve member 661 in the valve closing direction.

The housing 660 is configured by a first division body 663 and a second division body 664.

The first division body 663 is fitted and fixed onto a right end of a right side cylindrical portion 664*b* in the second division body 664, and a space surrounded by these serves as a first space S61 into which the suction fluid Ps flows.

In addition, a partition wall portion 663*f* and a through hole 663*g* are provided on the right side of the first division body 663. A second space S62 is provided on the axially right side of the partition wall portion 663*f*. The second space S62 is provided and recessed so as to be open on the axially right side with respect to the first division body 663.

The second division body 664 includes the right side cylindrical portion 664*b* and a left side cylindrical portion 664*c*.

A valve hole 664*a* and a partition wall portion 664*f* are provided in a left end of the right side cylindrical portion 664*b*. The valve hole 664*a* provides communication between the first space S61 and a third space S63. A corner on the right end inner diameter side in the partition wall portion 664*f* serves as a valve seat 665.

In addition, a communication hole 664*e* communicating with a low-pressure chamber 20 is provided on a peripheral wall of the right side cylindrical portion 664*b*. A space surrounded by the right side cylindrical portion 664*b* serves as the first space S61 into which the suction fluid Ps flows.

A space surrounded by the left side cylindrical portion 664*c* and a lid member 609 serves as the third space S63 into which the control fluid Pb flows. A communication hole 609*a* communicating with the back pressure chamber 50 is provided in the lid member 609.

The valve member 661 includes a large diameter portion 661*a* and an extending shaft portion 661*c*.

The large diameter portion 661*a* is arranged in the first space S61. A surface on the axially left side of the large diameter portion 661*a* serves as a tapered surface 667 connectable to and separable from the valve seat 665, and together with the valve seat 665 by discharging the control fluid Pb to the low-pressure chamber 20, serves as a valve that adjusts the pressure of the control fluid Pb.

In addition, a compression spring 662 is arranged between the lid member 609 and the tapered surface 667. The disc spring 666 is arranged between the large diameter portion 661*a* and the partition wall portion 663*f* of the first division body 663.

The extending shaft portion 661*c* is inserted into the through hole 663*g*. An axially right end surface 661*f* of the extending shaft portion 661*c* serves as a pressure receiving surface that receives fluid pressure in the second space S62.

Next, opening and closing actions of the control valve V6 will be described. With the axially left side serving as the positive side, a force ($F_{Ps}$) by the pressure of the suction fluid Ps in the first space S61, a force ($F_{Pd}$) by the pressure of the discharge fluid Pd in the second space S62, a force ($F_{Pb}$) by the pressure of the control fluid Pb of the third space S63, a bias force ($F_{sp1}$) of the compression spring 662, and a bias force ($F_{sp2}$) of the disc spring 666 act on the valve member 661 (that is, with the left side serving as the positive side, a force $F_v=F_{Ps}+F_{Pd}-F_{Pb}-F_{sp1}+F_{sp2}$ acts on the valve member 661).

Specifically, the pressure of the suction fluid Ps of the first space S61 acts leftward in the axial direction with respect to an area obtained by subtracting an effective pressure receiving area B6 of the extending shaft portion 661*c* from an effective pressure receiving area A6 of the large diameter portion 661*a*. That is, with the axially left side serving as the positive side, the force ($F_{Ps}$)=Ps×(A6−B6) by the pressure of the suction fluid Ps acts on the valve member 661.

In addition, the pressure of the discharge fluid Pd of the second space S62 acts leftward in the axial direction with respect to the effective pressure receiving area B6 of the extending shaft portion 661*c*. That is, with the axially left side serving as the positive side, the force ($F_{Pd}$)=Pd×B6 by the pressure of the discharge fluid Pd acts on the valve member 661.

It is noted that a pressure receiving surface (B6) of the discharge fluid Pd is narrower than a pressure receiving surface (A6−B6) of the suction fluid Ps (B6<A6−B6).

Meanwhile, the pressure of the control fluid Pb of the third space S63 acts rightward in the axial direction with respect to the effective pressure receiving area A6 of the large diameter portion 661*a*. That is, with the axially right side serving as the positive side, the force ($F_{Pb}$)=Pb×A6 by the pressure of the control fluid Pb acts on the valve member 661.

It is noted that the pressure receiving surface (B6) of the discharge fluid Pd is narrower than a pressure receiving surface (A6) of the control fluid Pb (B6<A6).

That is, with the left side serving as the positive side, the expression of Pb={Pd×B6+Ps×(A6−B6)−$F_{sp1}$+$F_{sp2}$}/A6 is established.

In other words, in a case where the sum of the force ($F_{Pd}$) by the pressure of the discharge fluid Pd, the force ($F_{Ps}$) by the pressure of the suction fluid Ps, and the bias force ($F_{sp2}$) of the disc spring 666, the forces acting leftward in the axial direction is smaller than the sum of the force ($F_{Pb}$) by the pressure of the control fluid Pb and the bias force ($F_{sp1}$) of the compression spring 662, the forces acting rightward in the axial direction, by pressing the valve member 661 rightward in the axial direction, that is, in the valve opening direction, the large diameter portion 661*a* is separated from the valve seat 665, and the control valve V6 is brought into a valve-opened state.

Meanwhile, although not directly illustrated, in a case where the sum of the force ($F_{Pd}$) by the pressure of the discharge fluid Pd, the force ($F_{Ps}$) by the pressure of the suction fluid Ps, and the bias force ($F_{sp2}$) of the disc spring 666, the forces acting leftward in the axial direction is larger than the sum of the force ($F_{Pb}$) by the pressure of the control fluid Pb and the bias force ($F_{sp1}$) of the compression spring 662, the forces acting rightward in the axial direction, by pressing the valve member 661 leftward in the axial direction, that is, in the valve closing direction, the large diameter portion 661*a* is seated on the valve seat 665, and the control valve V6 is brought into a valve-closed state.

It is noted that, although not directly illustrated, as a modified example of the present embodiment, for example, the disc spring 666 may be omitted.

With such a configuration, with the left side serving as the positive side, a force $F_v=F_{Ps}+F_{Pd}-F_{Pb}-F_{sp1}$ acts on the valve member 661. That is, with the left side serving as the positive side, the expression of $Pb=\{Pd\times B6+Ps\times(A6-B6)-F_{sp1}\}/A6$ is established.

Seventh Embodiment

Figure 9:
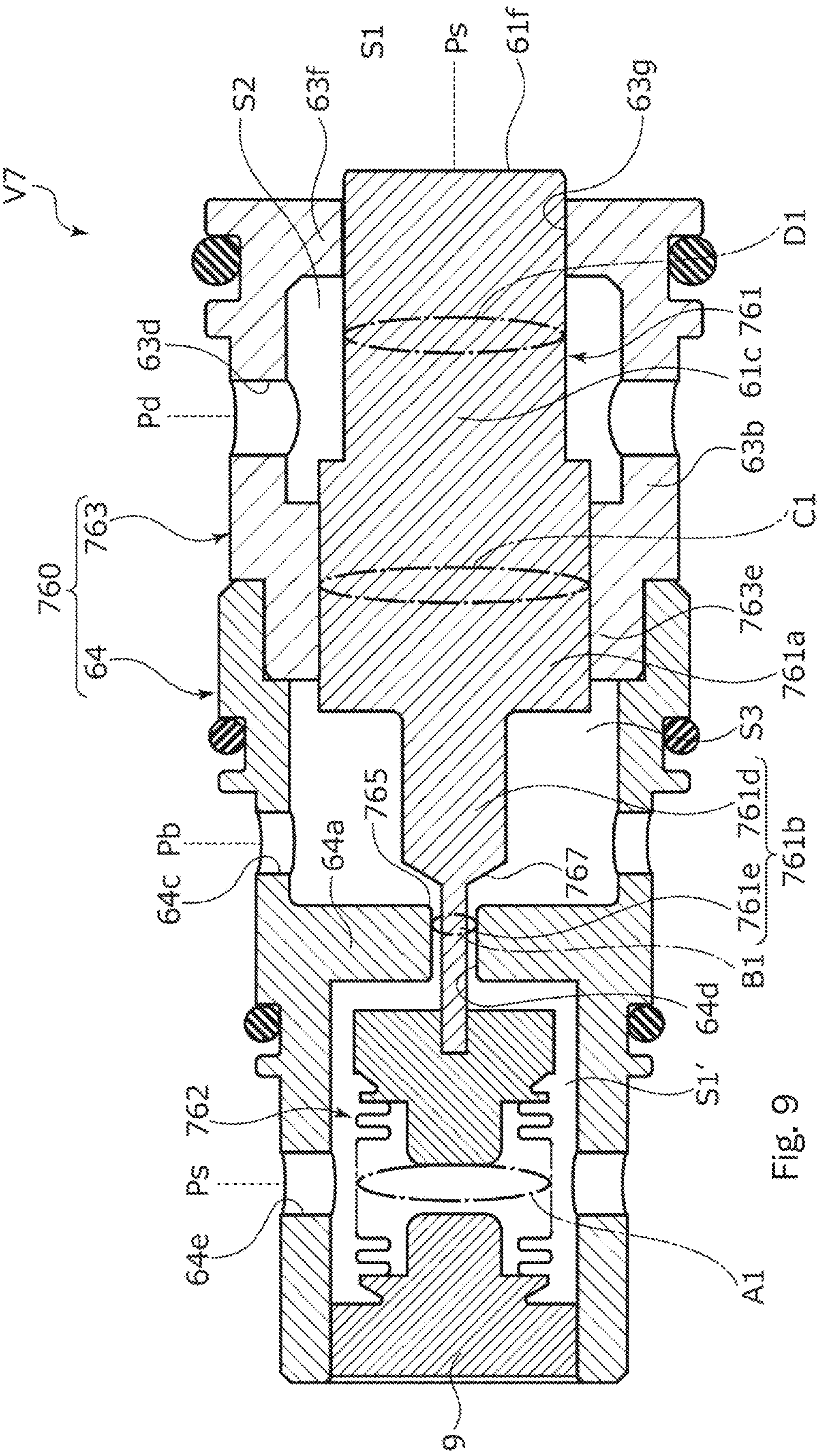
FIG. 9 is a sectional view illustrating a valve according to a seventh embodiment of the present invention.

Next, a valve according to a seventh embodiment of the present invention will be described with reference to FIG. 9. It is noted that duplicated configurations which are the same configurations as the first embodiment will not be described.

A control valve V7 in the seventh embodiment has a configuration that a part where the housing 60 and the valve member 61 slide with each other is replaced with a valve configured by the housing 60 and the valve member 61 in the first embodiment.

In more detail, a gap between an inner peripheral surface of a partition wall portion 763*e* of a first division body 763 in a housing 760 and an outer peripheral surface of a large diameter portion 761*a* in a valve member 761 is extremely small, and both the surfaces slide with each other.

A through hole 64*d* in a second division body 64 serves as a valve hole, and a corner of the right end inner diameter side in a partition wall portion 64*a* serves as a valve seat 765.

A surface on the axially left side of a first shaft portion 761*d* of a stepped small diameter portion 761*b* in the valve member 761 serves as a tapered surface 767 connectable to and separable from the valve seat 765, and together with the valve seat 765 by discharging the control fluid Pb to the low-pressure chamber 20, serves as a valve that adjusts the pressure of the control fluid Pb.

A second shaft portion 761*e* of the stepped small diameter portion 761*b* in the valve member 761 is inserted into the through hole 64*d* in the second division body 64 and connected to a bellows 762. The second shaft portion 761*e* has a sectional area smaller than a flow passage sectional area of the through hole 64*d*, that is, an effective pressure receiving area B1, and together with the partition wall portion 64*a*, configures a flow passage through which a fluid can pass.

As described above, with the valve of the present invention, the sliding part may be replaced with the valve.

The embodiments of the present invention are described above with the drawings. However, specific configurations are not limited to these embodiments, and the present invention includes changes and additions within a range not departing from the scope of the present invention.

For example, the first to seventh embodiments exemplify the mode in which the pressure receiving surface of the discharge fluid is smaller than the pressure receiving surface of the control fluid. However, the pressure receiving surface of the discharge fluid may be the same as the pressure receiving surface of the control fluid or may be larger than the pressure receiving surface of the control fluid.

In addition, the first to seventh embodiments exemplify the mode in which the bias member is provided. However, the configuration of the bias member may be omitted.

In addition, the first to seventh embodiments exemplify the mode in which the bias member is a compression spring. However, the bias member may be an extension spring.

In addition, the third and fourth embodiments exemplify the solenoid as the drive source. However, other drive sources may be used.

In addition, in the third and fourth embodiments, the rod of the drive source is not limited to connection to and separation from the valve element, but the valve element and the rod may be integrally connected.

In addition, the first to seventh embodiments describe the example in which the valve element is brought into surface contact with the valve seat in an annular form. However, for example, the valve element may be brought into line contact in an annular form.

In addition, the first to seventh embodiments describe the valve applied to the scroll compressor C to be used in an air conditioning system of an automobile, etc. However, the present invention is not limited to this and the valve may be utilized for controlling various working fluids.

In addition, the first to seventh embodiments describe the example in which the valve is a pressure control valve. However, for example, the valve may be an expansion valve arranged between a condenser and an evaporator in an air conditioning system, or a capacity control valve assembled in a variable capacity type compressor in an air conditioning system, etc.

In addition, the suction fluid, the discharge fluid, or the control fluid may respectively be a gas, a liquid, or a mixture of a gas and a liquid.

In addition, the first and third embodiments exemplify the mode in which the first spaces are provided on both the axial sides of the housing. However, the first space is only required to be provided on one of the sides.

In addition, it is possible to freely change an arrangement relationship between the first space, the second space, and the third space.

In addition, the first to seventh embodiments describe the configuration that the inner peripheral surface of the partition wall portion configuring the through hole of the housing excluding the valve hole and the outer peripheral surface of the valve element directly slide with each other. However, the present invention is not limited to this but a packing such as an O ring, a ground packing, a labyrinth seal, and a V packing may be provided between the inner peripheral surface of the partition wall portion and the outer peripheral surface of the valve element. With such a configuration, it is not only possible to more reliably prevent that the refrigerant is moved between the adjacent spaces, but also possible to align the valve element with respect to the housing.

In more detail, in the first embodiment, a packing may be provided between the inner peripheral surface of the partition wall portion 63*f* and the outer peripheral surface of the extending shaft portion 61*c*, a packing may be provided between the partition wall portion 64*a* and the outer peripheral surface of the second shaft portion 61*e*, or a packing may be provided in only one of these. In addition, in the second embodiment, a packing may be provided between an inner peripheral surface of the partition wall portion 263*f* and an outer peripheral surface of the small diameter portion 261*b*. In addition, in the fifth embodiment, a packing may be provided between an inner peripheral surface of the partition wall portion 563*f* and an outer peripheral surface of the extending shaft portion 561*c*, a packing may be provided between the partition wall portion 564*f* and an outer peripheral surface of the small diameter portion 561*b*, or a packing may be provided in only one of these. In addition, in the sixth embodiment, a packing may be provided between an inner peripheral surface of the partition wall portion 663*f* and an outer peripheral surface of the extending shaft portion 661*c*. In addition, in the seventh embodiment, a packing may be provided between an inner peripheral surface of the partition wall portion 63*f* and an outer peripheral surface of the extending shaft portion 61*c*, a packing may be provided between the inner peripheral surface of the partition wall portion 763*e* and the outer peripheral surface of the large diameter portion 761*a*, or a packing may be provided in only one of these.

Further, upon providing a packing, a packing may be arranged in a recessed portion formed in the housing, the recessed portion being open on one axial side, a packing may be arranged in an annular groove formed in the housing, the groove being open in the inner diameter direction, or a packing may be arranged in an annular groove formed in the valve element, the groove being open in the outer diameter direction. The configuration for arranging a packing may be appropriately changed.

In addition, the first to seventh embodiments describe that the inner peripheral surface of the partition wall portion configuring the through hole of the housing excluding the valve hole and the outer peripheral surface of the valve element are respectively flat surfaces. However, the present invention is not limited to this but at least one dynamic pressure generation groove that generates dynamic pressure upon relative sliding of the inner peripheral surface of the partition wall portion and the outer peripheral surface of the valve element, such as an annular groove and a spiral groove may be formed. With such a configuration, by utilizing the dynamic pressure generated by the groove, not only sliding becomes smooth but also it is possible to align the valve element with respect to the housing. In addition, with the annular groove, it is possible to configure a labyrinth seal and enhance sealing performance.

In more detail, in the first embodiment, a dynamic pressure generation groove may be provided in at least one of the inner peripheral surface of the partition wall portion 63*f* and the outer peripheral surface of the extending shaft portion 61*c*, a dynamic pressure generation groove may be provided in at least one of the partition wall portion 64*a* and the outer peripheral surface of the second shaft portion 61*e*, or a dynamic pressure generation groove may be provided in only one pair among these. In addition, in the second embodiment, a dynamic pressure generation groove may be provided in at least one of the inner peripheral surface of the partition wall portion 263*f* and the outer peripheral surface of the small diameter portion 261*b*. In addition, in the fifth embodiment, a dynamic pressure generation groove may be provided in at least one of the inner peripheral surface of the partition wall portion 563*f* and the outer peripheral surface of the extending shaft portion 561*c*, a dynamic pressure generation groove may be provided in at least one of the partition wall portion 564*f* and the outer peripheral surface of the small diameter portion 561*b*, or a dynamic pressure generation groove may be provided in only one pair among these. In addition, in the sixth embodiment, a dynamic pressure generation groove may be provided in at least one of the inner peripheral surface of the partition wall portion 663*f* and the outer peripheral surface of the extending shaft portion 661*c*. In addition, in the seventh embodiment, a dynamic pressure generation groove may be provided in at least one of the inner peripheral surface of the partition wall portion 63*f* and the outer peripheral surface of the extending shaft portion 61*c*, a dynamic pressure generation groove may be provided in at least one of the inner peripheral surface of the partition wall portion 763*e* and the outer peripheral surface of the large diameter portion 761*a*, or a dynamic pressure generation groove may be provided in only one pair among these.

In addition, any one of or both the packing and the dynamic pressure generation groove described above may be provided.

REFERENCE SIGNS LIST

60 Housing
61 Valve member (valve element)
61*a* Large diameter portion
62 Bellows (bias member)
65 Valve seat
80 Solenoid (drive source)
85 Rod
260 Housing
261 Valve member (valve element)
261*a* Large diameter portion
262 Spring (bias member)
265 Valve seat
460 Housing
560, 660, 760 Housing
561, 661, 761 Valve member (valve element)
562, 662, 762 Bellows (bias member)
566, 666, 766 Disc spring (bias member)
770 O ring
c Scroll compressor
Pb Control fluid
Pd Discharge fluid
Ps Suction fluid
S1, S1', S21, S51, S61, S71 First space
S2, S22, S52, S52', S62, S72 Second space
S3, S23, S53, S63, S73 Third space
S4 Communication space
V1 to V7 Control valve

The invention claimed is:

1. A pressure control valve, comprising:

a housing configured to partition a first space into which a suction fluid flows, a second space into which a discharge fluid flows, and a third space into which a control fluid flows; and a valve element configured to be separated from and seated on the housing so that fluid flows in and out the third space, wherein a pressure receiving surface of the discharge fluid acting on the valve element is narrower than a pressure receiving surface of the suction fluid acting on the valve element, and pressure of the discharge fluid and pressure of the control fluid act on the valve element in opposed directions upon separation and seating of the valve element.

2. The pressure control valve according to claim 1, wherein the pressure receiving surface of the discharge fluid is narrower than a pressure receiving surface of the control fluid acting on the valve element.

3. The pressure control valve according to claim 2, wherein at least one of the first space, the second space and the third space is divided into a first space and a second space each of which is arranged in each of both axial ends of the housing.

4. The pressure control valve according to claim 1, wherein pressure of the suction fluid and pressure of the discharge fluid act on the valve element in a same direction upon separation and seating of the valve element.

5. The pressure control valve according to claim 4, wherein at least one of the first space, the second space and the third space is divided into a first space and a second space each of which is arranged in each of both axial ends of the housing.

6. The pressure control valve according to claim 1, comprising:

a bias member configured to bias the valve element in separation and seating directions.

7. The pressure control valve according to claim 6, wherein at least one of the first space, the second space and the third space is divided into a first space and a second space each of which is arranged in each of both axial ends of the housing.

8. The pressure control valve according to claim 1, wherein at least one of the first space, the second space and the third space is divided into a first space and a second space each of which is arranged in each of both axial ends of the housing.

9. The pressure control valve according to claim 1, further comprising:

a drive source that is configured to drive the valve element.

10. The pressure control valve according to claim 9, wherein the drive source has a rod connectable to and separable from the valve element.

* * * * *